(12) United States Patent
Townsend, IV

(10) Patent No.: US 12,140,116 B2
(45) Date of Patent: *Nov. 12, 2024

(54) DISPLACEMENT DEVICE INCLUDING FORCE DISPLACEMENT MECHANISM WITH CONSTANT VOLUME BOOT

(71) Applicant: Ernest William Townsend, IV, Scottsdale, AZ (US)

(72) Inventor: Ernest William Townsend, IV, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/230,097

(22) Filed: Aug. 3, 2023

(65) Prior Publication Data
US 2023/0374966 A1 Nov. 23, 2023

Related U.S. Application Data

(63) Continuation of application No. 18/170,940, filed on Feb. 17, 2023, now Pat. No. 11,754,036, which is a
(Continued)

(51) Int. Cl.
*F03B 17/04* (2006.01)
*F03B 17/02* (2006.01)
(Continued)

(52) U.S. Cl.
CPC .......... *F03B 17/04* (2013.01); *F03B 17/025* (2013.01); *F03G 3/00* (2013.01); *F15B 15/10* (2013.01); *F16J 3/04* (2013.01); *F16J 3/06* (2013.01)

(58) Field of Classification Search
CPC .......... F03B 17/04; F03B 17/025; F03G 3/00; F15B 15/10; F16J 3/04; F16J 3/06
(Continued)

(56) References Cited

U.S. PATENT DOCUMENTS 2,453,841 A * 11/1948 Gluzek ............... A61B 5/0053
600/557
2,773,482 A 12/1956 Dickie
(Continued)

FOREIGN PATENT DOCUMENTS

EP 0198734 A1 10/1996
GB 2421768 A 7/2006
(Continued)

OTHER PUBLICATIONS

The Peak Oil Crisis: Energy from Buoyancy—A New Disruptive Technology? Peakoil.com, accessed Mar. 10, 2018.
(Continued)

*Primary Examiner* — Hoang M Nguyen
(74) *Attorney, Agent, or Firm* — Parsons & Goltry, PLLC; Michael W. Goltry; Robert A. Parsons

(57) ABSTRACT

A bi-level tank includes a transfer tank and a return tank containing a volume of water, including transfer and return components in the transfer and return tanks, respectively, and a transition component. A bellows couples an upper surface of a piston in the transfer tank to the return component that exerts pressure on the upper surface, while a lower surface of the piston is under pressure from a pressured fluid supplied by a source thereof, producing a pressure differential on the piston. Actuation of a force-applying mechanism on the piston sufficient to overcome the pressure differential displaces the piston for exchanging respective volumes of the return component and the fluid from the source. An extensible and retractable constant-volume boot holds the transition component around the bellows and has valves configured to open and close for equalizing pressure between the boot and the transfer tank.

20 Claims, 13 Drawing Sheets

Related U.S. Application Data continuation of application No. 17/705,009, filed on Mar. 25, 2022, now Pat. No. 11,608,810, which is a continuation-in-part of application No. 17/396,723, filed on Aug. 8, 2021, now abandoned, which is a continuation of application No. 16/788,683, filed on Feb. 12, 2020, now abandoned.

(51) Int. Cl.
  *F03G 3/00* (2006.01)
  *F15B 15/10* (2006.01)
  *F16J 3/04* (2006.01)
  *F16J 3/06* (2006.01)

(58) Field of Classification Search
  USPC .................................. 60/495–496; 92/37–39
  See application file for complete search history.

(56) References Cited

U.S. PATENT DOCUMENTS

| | | | |
|---|---|---|---|
| 2,795,239 | A | 6/1957 | Eckman et al. |
| 3,528,344 | A | 9/1970 | Rabenhorst |
| 3,603,425 | A | 9/1971 | Campbell |
| 3,857,242 | A | 12/1974 | Gilmore |
| 3,952,517 | A | 4/1976 | Decker |
| 4,155,224 | A | 5/1979 | Hopping |
| 4,718,232 | A | 1/1988 | Wilmouth |
| 5,046,745 | A | 9/1991 | Sweetland et al. |
| 5,359,490 | A | 10/1994 | Oguro |
| 5,944,480 | A | 8/1999 | Forrest |
| 6,249,057 | B1 | 6/2001 | Lehet |
| 6,420,794 | B1 | 7/2002 | Cao |
| 6,734,574 | B2 | 5/2004 | Shin |
| 6,817,180 | B2 | 11/2004 | Newman |
| 6,978,610 | B2 | 12/2005 | Camahan |
| 7,134,283 | B2 | 11/2006 | Villalobos |
| 7,573,147 | B2 | 8/2009 | Karim |
| 7,765,804 | B2 | 8/2010 | Davis |
| 8,011,182 | B2 | 9/2011 | Hastings |
| 8,015,807 | B1 | 9/2011 | Akutsu |
| 8,112,992 | B2 | 2/2012 | Pirincci |
| 8,198,748 | B1 | 6/2012 | Korzen |
| 8,307,642 | B2 | 11/2012 | Davis |
| 8,692,395 | B2 | 4/2014 | Yeh |
| 8,756,932 | B2 | 6/2014 | Pirincci |
| 8,920,135 | B2 | 12/2014 | Daily |
| 8,981,582 | B2 | 3/2015 | Grossman |
| 11,608,810 | B2 | 3/2023 | Townsend, IV |
| 11,754,036 | B2 * | 9/2023 | Townsend, IV .......... F03G 3/00 60/497 |
| 2002/0149204 | A1 | 10/2002 | Rauschenberger |
| 2003/0059292 | A1 | 3/2003 | Baker |
| 2005/0127680 | A1 | 6/2005 | Shaochum |
| 2006/0042244 | A1 | 3/2006 | Villalobos |
| 2007/0248339 | A1 | 10/2007 | Akiyama |
| 2009/0235659 | A1 | 9/2009 | Lin |
| 2009/0252563 | A1 | 10/2009 | Gillespie |
| 2009/0309373 | A1 | 12/2009 | O'Briant |
| 2010/0115940 | A1 | 5/2010 | Propp |
| 2010/0126804 | A1 | 5/2010 | Sabapathy |
| 2010/0127509 | A1 | 5/2010 | McCarthy |
| 2010/0180587 | A1 | 7/2010 | Manakkattupadeettathil |
| 2010/0187833 | A1 | 7/2010 | Pirincci |
| 2011/0012369 | A1 | 1/2011 | Grossman |
| 2011/0083430 | A1 | 4/2011 | Kim |
| 2011/0156407 | A1 | 6/2011 | Dorozenski |
| 2012/0119508 | A1 | 5/2012 | Sparks |
| 2012/0159941 | A1 | 6/2012 | Pirincci |
| 2013/0168970 | A1 | 7/2013 | Grossman |
| 2014/0196450 | A1 | 7/2014 | Boyd |
| 2014/0312623 | A1 | 10/2014 | Anteau |
| 2015/0020518 | A1 | 1/2015 | Manoj |
| 2016/0207600 | A1 | 7/2016 | Grossman |
| 2016/0215753 | A1 | 7/2016 | Westmoreland |
| 2017/0130692 | A1 | 5/2017 | Chaney |
| 2019/0055915 | A1 | 2/2019 | Townsend |
| 2019/0055916 | A1 | 2/2019 | Townsend |
| 2019/0203690 | A1 | 7/2019 | Townsend |
| 2019/0249643 | A1 | 8/2019 | Townsend |
| 2019/0249644 | A1 | 8/2019 | Townsend |
| 2019/0301426 | A1 | 10/2019 | Townsend |
| 2019/0338747 | A1 | 11/2019 | Townsend |

FOREIGN PATENT DOCUMENTS

| | | |
|---|---|---|
| GB | 2430471 A | 3/2007 |
| JP | 10141204 A | 5/1998 |
| JP | 2008064084 A | 3/2008 |
| WO | 9631696 A1 | 10/1996 |
| WO | 0179692 A1 | 10/2001 |
| WO | 2009072796 A2 | 6/2009 |

OTHER PUBLICATIONS

Buoyancy Motor No. 4, Comments by Donal Simanek, https://lockhaven.edu/-dsimanek/museum/buoy4.htm, accessed Nov. 2, 2018.
Form PCT/ISA/210 International Search Report and Form PCT/ISA/237 Written Opinion of the International Searching Authority from International Patent Application No. PCT/US21/13119, dated Mar. 31, 2021.
Form PCT/ISA/210 International Search Report and Form PCT/ISA/237 Written Opinion of the International Searching Authority from International Patent Application No. PCT/US22/39660, dated Oct. 27, 2022.

* cited by examiner

|  | TIME | DUTY CYCLE | VALVE/PORT OPERATION | |
|---|---|---|---|---|
|  |  |  | ACCESS | TRANSFER |
| POWER PATH [GRAVITY] | $t_0$ | RELEASE MODULE FROM LAUNCH PLATFORM | OPEN | CLOSED |
|  | $t_1$ | MODULE FREE FALLS TO GAIN KINETIC ENERGY | OPEN | CLOSED |
|  | $t_2$ | MODULE ENGAGES GENERATOR FOR ENERGY TRANSFER | OPEN | CLOSED |
|  | $t_3$ | MODULE DISENGAGES FROM LINEAR GENERATOR AND ENTERS TRANSFER TANK | OPEN | CLOSED |
|  | $t_4$ | MODULE DECELERATES TO ZERO | CLOSED | OPEN |
| RETURN PATH [BUOYANCY] | $t_5$ | DISPLACEMENT DEVICE IS ACTIVATED | CLOSED | OPEN |
|  | $t_6$ | MODULE REPOSITIONED IN TRANSFER TANK | CLOSED | OPEN |
|  | $t_7$ | BUOYANCY MOVES MODULE INTO RETURN TANK | CLOSED | OPEN |
|  | $t_8$ | MODULE IN RETURN TANK AS DISPLACEMENT DEVICE IS DEACTIVATED | OPEN | CLOSED |
|  | $t_9$ | MOMENTUM RETURNS MODULE TO LAUNCH PLATFORM | OPEN | CLOSED |

FIG. 6

DISPLACEMENT DEVICE INCLUDING FORCE DISPLACEMENT MECHANISM WITH CONSTANT VOLUME BOOT

FIELD OF THE INVENTION

The present invention relates to machines that drive power generators, to machines that cyclically move submerged structures through a liquid, such as water, and to displacement devices configured to lift an upright column of a liquid, such as water.

BACKGROUND OF THE INVENTION

A machine of the present invention uses the inherent weight of a power module as it falls through air from an elevated position or start point to drive an electric generator. Upon disengagement from the generator, the power module falls into a bi-level water tank where its inherent buoyancy overcomes its weight. The power module then returns through the bi-level tank by buoyancy to the start point to begin another duty cycle. Thus, the machine operationally employs a tradeoff between the power module's weight and buoyancy. Several power modules can be employed to provide for a continuous generation of electricity.

The movement of a power module through a duty cycle involves several different physical phenomena. Individually, these phenomena are all well known and, in many instances, elementary. An understanding of how these physically different phenomena are interactively combined is essential. Importantly, Newton's Second Law (F=ma) is used effectively and the first law of thermodynamics concerning conservation of energy is not violated. With this in mind, an appreciation of the dynamics of a moving object is necessary.

A dynamics analysis involves an evaluation of the motive forces that act to change the velocity of an object. As is well known, accelerations and decelerations respectively increase or decrease the velocity of an object. In the specific situation where the velocity remains constant, it is common to refer to the situation as being "steady state". In any event, it is important to consider that whenever an object is moving, a drag force (D) is generated that acts against the movement of the object.

In the context of the present invention, the only motive forces acting on an object are the object's weight (W) and its buoyancy (B). It is due to these forces, and these forces alone, that the object moves and has velocity. However, when the object is required to alternately move through air and water, the forces of buoyancy (B) and drag (D) will change due to physical differences between the medium through which the object is moving. Consequently, a consideration of an object's velocity is important for several reasons. Most importantly are the work/energy relationship and the impulse/momentum relationship.

Briefly, it is well known that the work/energy relationship is derived from Newton's Second Law: F=ma. In this relationship, F is a force, m is the mass of an object and a is the object's acceleration. Further, work (U) is mathematically defined by a force/distance relationship in the equation $U=\int Fds$. Energy, on the other hand, is defined as the capacity of a moving object to do work (U). Using the definition and F=ma in the equation $U=\int Fds$, it can be mathematically derived that work results from a kinetic energy that is equal to $\frac{1}{2}mv^2$ wherein v is the object's velocity.

The impulse/momentum relationship, like the work/energy relationship, is also derived from Newton's Second Law. In this case, however, the impulse (I) of a force is mathematically defined as a force/time relationship by the equation $I=\int Fdt$. Again, using F=ma, the equation $I=\int Fdt$ can be mathematically derived to show that the impulse of a moving object is due to a change in its momentum mv. Stated differently, the equation $I=\int Fdt$ tells us that impulse provides the impetus for an object to keep moving. Physically, this impetus is equal to a change in the object's momentum over an interval of time dt.

And so energy is the capacity to perform work. The energy of an object can be expressed as either potential energy or kinetic energy. Potential energy differs from kinetic energy in that potential energy is determined by the position of the object in the earth's gravitational field. Kinetic energy is determined by the motion of the object through the earth's gravitational field.

It is well known that when an object of weight W falls from a high point where it has zero velocity to a low point where it again has zero velocity the object loses potential energy as it falls. During its fall, the object generates kinetic energy by its velocity. Again, and with this in mind, a machine of the present invention involves considerations for a tradeoff between both forms of energy.

In the gravitational field of a Newtonian reference frame there are two known forces, namely, gravity and buoyancy. As a practical matter, and with regard to an object having a predetermined mass and density, there are two characteristics of the gravity and buoyancy forces acting on an object in a gravitational field that are universally agreed upon. One is the fact that they will act on the object at the same time in opposite directions to each other. The other characteristic is that the forces of buoyancy and gravity on an object are constant and cannot be altered.

For an example of the counteracting effects that gravity and buoyancy will have on a buoyant object, consider the case where the object is dropped onto a straight path into a pool of water, from a start point at a predetermined height above the pool. Immediately upon entering the pool, the buoyant force on the object overcomes the gravity force on the object (i.e. its weight). The result here is that the object will decelerate to a rest point in the pool where it will have zero velocity. Unless somehow altered, it will then return along the same path from the submerged rest point to the surface of the poor under the influence of its buoyancy force. In the case of a pool, the object will return to the surface of the pool.

Clearly, in order to repeatedly benefit from the kinetic energy that is generated by a buoyant object during its fall into a pool, the object cannot be left floating in the pool. Instead, it must somehow be returned to its original start point above the surface of the pool. One way to do this is to establish an offset underwater pathway for the object that extends upward and beyond the surface of the pool, back up to the original start point. With such an underwater pathway, instead of stopping at the surface of the pool, a buoyant object will continue along the offset underwater pathway from its submerged rest point to the original start point.

A machine that incorporates such an underwater pathway as suggested above, is disclosed in U.S. patent application Ser. No. 15/677,800 for an invention entitled "Machine Generator with Cyclical, Vertical Mass Transport Mechanism" which was filed on Aug. 15, 2017 by the inventor of the present invention. As disclosed in this earlier filed patent application, there are at least three interrelated considerations to be addressed for the establishment of an underwater pathway. These include: i) providing a bi-level water tank having an upper surface that is level with an original start point at a height above its lower surface; ii) maintaining a height differential between the upper surface and the lower surface; and iii) cyclically reestablishing an underwater pathway that is offset from the object's drop path to accommodate the travel of successive objects along the underwater pathway. The present invention is focused on the last consideration, i.e. cyclically reestablishing the underwater pathway.

Based on the disclosure of U.S. patent application Ser. No. 15/677,800, mentioned above, an important consideration for reestablishing an underwater pathway is the power requirement for repetitively lifting a vertically-oriented column of water in the bi-level tank. In particular, this power requirement arises for two interrelated reasons. Firstly, power is required to prevent drainage from the bi-level tank when both its upper and lower surfaces are exposed. For this purpose a valve mechanism is provided to isolate the lower surface of the bi-level tank from the upper surface by closing off an upper portion of the underwater pathway. This action thus allows the lower surface to be open so an object can enter the tank through the open lower surface. The consequence of this, however, is a rise in the level of the lower surface of the bi-level tank. Secondly, after the object has entered the bi-level tank, power is required by the valve mechanism to open the underwater pathway and allow the object to continue moving along the underwater pathway toward the upper surface, while the lower surface is covered. During this time, while the underwater pathway is open, a volume of air or a solid mass that corresponds to the object's volume is injected into (i.e. created in) the bi-level tank. The purpose here is to displace water in the bi-level tank by lifting a column of water toward the upper surface of the bi-level tank. When this lifting action is completed, the valve mechanism again closes off the underwater pathway and exposes the lower surface. Then, as the air volume is removed from the tank, the lower surface level drops back to where it was before. In particular, as noted above, this is done so that a successive object can enter the bi-level tank.

Specifically, the above described actions regarding upper and lower surface levels are directed to the consideration for maintaining a height differential between the upper surface and the lower surface of the bi-level tank. During an operation, however, this requires lifting a vertically-oriented column of water. Because, the vertically-oriented column of water will inevitably be very heavy, e.g. several tons, the power requirement for the operation of a bi-level tank as considered above will necessarily be substantial.

With the above in mind, it is an object of the present invention to use the earth's gravitational field as a source of renewable energy for the purpose of generating electric power. Another object of the present invention is to employ the work/energy and impulse/momentum relationships for the purpose of operating a machine that will drive an electric generator. It is also an object of the present invention to provide a mechanical engineer with the disclosure of an innovative technology that teaches how to make and use the technology of the present invention for the benefit of mankind. It is yet a further object of the present invention is to provide a system for lifting a vertically-oriented column of water which minimizes the power requirement for moving the water column. Another object of the present invention is to provide a system for cyclically lifting a vertically-oriented column of water which can continuously accommodate a succession of objects as they are cycled through a bi-level tank. Still another object of the present invention is to provide a system for lifting a vertically-oriented column of water which is easy to operate, is environmentally "green", and is commercially viable.

For purposes of disclosure, the following definitions and notations are provided for easy reference when considering the descriptions of structure and operation of the present invention as set forth in the specification for the present invention.

Definitions

Buoyancy means the apparent loss in weight of a body when wholly or partly immersed in a fluid; due to the upthrust exerted by the fluid.

Coefficient of drag ($C_D$) is a numerical multiplier that quantifies drag.

Control means an instrument or apparatus to regulate a machine.

Dive means to plunge into water.

Drag (D) is the force resistance to the motion of an object through a fluid.

Dynamics is the branch of mechanics dealing with the motions of material bodies under the action of given forces.

Energy is the capacity to do work.

Force is the action of one body on another.

Gravity is the force that attracts a body toward the center of the earth.

Head Height is a distance representing the height above a datum which would give a unit mass of a fluid in a conduit a potential energy equal to the sum of its actual potential energy, its kinetic energy and its pressure energy.

Impulse means to drive or impel with a sudden force.

Kinetic energy is the capacity for doing work by virtue of the motion of the body. Mathematically equal to $\frac{1}{2}mv^2$ where m is mass and v is the velocity of the body.

Momentum is the impetus (force) that keeps an object moving. Mathematically equal to mv.

Potential energy is the capacity for doing work by virtue of the position of the body.

Power is the time-rate of doing work.

Sink means to go below the surface of water.

Steady-State is an operation that does not change with time and therefore maintains a state of relative equilibrium.

Submerge means to be covered with water.

Terminal velocity means the constant speed that a freely falling (moving) body eventually reaches when the resistance of the medium through which it is falling (moving) prevents further acceleration.

Thermodynamics is the branch of physics dealing with the laws governing conversions of energy.

Work is the product of the magnitude of a force and the distance moved by its point of application along the line of action of the force (i.e. force×distance).

SUMMARY OF THE INVENTION

In general overview, an operation of the present invention is based on a DOWN and UP, closed-loop pathway that is followed by a power module during consecutive duty cycles. During the DOWN portion of a duty cycle, the predominant motive force acting on the power module is its weight W. During the UP portion of the duty cycle, however, the predominant motive force acting on the power module is its buoyancy B. A transfer of the motive force from W to B, and back to W, is the direct result of the fluid medium (e.g. air or water) in which the power module is moving. As a general statement, the power module's weight W dominates as the power module initially falls through air and then dives (plunges) into water during the DOWN portion of the duty cycle. Its buoyancy B thereafter dominates as the power module first decelerates and then rises in water for the UP portion of the duty cycle. This transfer of motive force dominance is possible due to the structure and operation of a bi-level tank.

There are two points in a power module's duty cycle where the motive force acting on the power module changes between W and B. The first is a change from W to B when the power module first enters the bi-level tank. The second is a change from B to W when the power module leaves the bi-level tank to begin another duty cycle.

From a technical perspective, as a power module enters the bi-level tank, the transfer of a motive force between W and B is best understood by first considering the work/energy relationship of the power module during the DOWN portion of its duty cycle. This will then be followed by a consideration of the impulse/momentum relationship in the UP portion of the duty cycle.

To begin the DOWN portion, the power module is dropped from a predetermined height and it accelerates to an engagement velocity, ve. Thus, the power module will have a velocity ve when it engages with an electric generator. While engaged with the electric generator the engagement velocity ve of the power module remains constant (i.e. it is in a steady state). In this steady state, the power module generates a kinetic energy equal to ½mve2, which is used to drive the electric generator. At the end of this power engagement, the power module disengages from the electric generator and immediately enters the bi-level tank. Importantly, after disengagement from the electric generator, the power module will start with an energy of ½mve2.

An important aspect of the power module's duty cycle is that, as it enters the bi-level tank, the power module encounters water which is subject only to atmospheric pressure. By way of example, this situation is the same as if the power module were being dropped into a swimming pool. In the event, although the power module is buoyant, it will still have an energy of ½mve2 as it enters the bi-level tank. Thus, using the mass m (i.e. weight W) of the power module and its velocity ve as design criteria, the power module can be engineered for its energy ½mve2 to do the work that is needed for it to dive and submerge into the bi-level tank.

As the power module enters the bi-level tank, due to the change in density of the media in which the power module travels, there will be a substantial increase in the buoyancy force B acting on the power module. Additionally, together with the buoyancy force B, a significant drag force D also begins to act on the power module. Further, both the buoyancy force B and the drag force D will act on the power module to oppose the weight W of the power module. Consequently, the power module initially decelerates in the bi-level tank until its velocity v is equal to zero. At the point where v becomes zero, the power module will begin to rise in the bi-level tank under the influence of its buoyancy B. For the present invention, it is important to recognize that the forces W, B and D can all be collectively engineered to optimize the deceleration of the power module in the bi-level tank.

At the point in its duty cycle where the power module has decelerated to zero velocity in the bi-level tank, the buoyancy force B will immediately dominate and cause the power module to begin rising (i.e. B>W). A simple example of this sink/rise phenomenon can be demonstrated by dropping ice into a glass of water.

Like the ice dropped into a glass of water, both the buoyancy force B and the weight W of the power module will remain constant. As the power module rises in the bi-level tank, however, the drag force D will begin to increase as a function of the power module's velocity squared, v2. As the power module rises in the bi-level tank during the UP portion of the duty cycle, the drag force D will act together with the weight W of the power module to oppose movement of the power module as it rises in the bi-level tank.

Movements of the power module in the bi-level tank are directly influenced by the drag forces D that act on the power module. It happens that the engineered design for coefficients of drag CD of the power module will influence the effect these drag forces D have on the velocities of the power module as it travels in the bi-level tank. Simply stated, CD is an engineering consideration.

For an operational perspective, it is necessary to know that the power module remains essentially upright in the bi-level tank as it decelerates at the end of the DOWN portion of a duty cycle, and also as it rises during the UP portion of the duty cycle. Consequently, a coefficient of drag CD(lower) for the lower end of the power module can be engineered to maximize its deceleration upon entering the bi-level tank. Furthermore, a coefficient of drag CD(upper) can be separately engineered for its upper end to maximize acceleration of the power module during its rise in the bi-level tank. In their relation to each other, CD(lower) is preferably greater than CD(upper).

An important design consideration for CD(lower) is that the power module must be able to submerge into the bi-level tank and then decelerate to zero velocity as soon as practicable. On the other hand, the important design consideration for CD(upper) is that the power module must attain its terminal velocity vt, before it exits from the bi-level tank. The terminal velocity vt is an important design consideration because vt and the mass m of the power module determine the momentum, mvt, that will be required for the power module to exit the bi-level tank at the end of a duty cycle.

At the top of the bi-level tank, the UP portion of the duty cycle is completed. Also, at this point the motive force on the power module will revert from B back to W. Further, the power module will have a zero velocity v, at least momentarily, before it begins another DOWN portion in the next duty cycle.

The base component for a machine of the present invention is a bi-level tank. As its nomenclature implies, its purpose is to hold a body of water that will have both an upper level water surface and a lower level water surface. To do this, a valve mechanism is incorporated into the bi-level tank that includes two separate, interactive valves. Alternately, the separate valves perform a changeover operation where they are either open/closed or closed/open. With these conditions, the valve mechanism will either isolate the upper water surface from the lower water surface, or it will establish an unobstructed underwater pathway through the bi-level tank.

Structurally, the bi-level tank includes both a lower transfer tank and an upper return tank. In this combination, the return tank is mounted above the transfer tank, and a transfer port is established between the two tanks. Thus, fluid communication between the upper return tank and the lower transfer tank will depend on whether the transfer port is open or closed by the valve mechanism. In addition to the transfer port between the return tank and the transfer tank, the transfer tank also has a separate access port.

A cooperative interaction between the transfer port and the access port is clearly necessary for the machine's operation. When the transfer port is open, an unobstructed underwater pathway is created through the bi-level tank that continues from the transfer tank and into the return tank. For this configuration of the bi-level tank, the access port must be closed. However, when the transfer port is closed, the transfer tank is isolated from the return tank and the access port can be opened.

Regardless whether the transfer port is open or closed, the upper level water surface of the return tank will always remain exposed to only the atmosphere. As noted above, however, when the transfer port is open, the access port must be closed. With this configuration for the bi-level tank, the return tank will be in fluid communication with the transfer tank and water pressure in the transfer tank will thereby be elevated under the influence of water in the return tank. On the other hand, when the transfer port is closed, the transfer tank is isolated from the return tank and the access port into the transfer tank is opened. For this configuration of the bi-level tank, the lower level water surface in the transfer tank will be exposed to only atmospheric pressure.

In addition to the bi-level tank, and the valve mechanism, the machine of the present invention also includes a buoyant power module. As noted above, the power module is dropped from a start point at an elevated height to start a duty cycle. At first, the power module falls through air and engages with an electric generator. Subsequently, when it disengages from the electric generator, the power module dives (plunges) into the transfer tank of the bi-level tank. The power module then proceeds through the transfer tank, and into the return tank along an unobstructed underwater pathway for a return to the duty cycle start point.

In accordance with an operation of the valve mechanism, an unobstructed underwater pathway through the bi-level tank is periodic. Moreover, in cooperation with an operation of the valve mechanism, the temporary presence of a power module in the transfer tank must be accounted for during an operation of the machine. Consequently, in order to accommodate the travel of a continuing succession of power modules along an unobstructed underwater pathway through the bi-level tank, the present invention incorporates a displacement device.

The displacement device of the present invention is submerged in the transfer tank of the bi-level tank, and it is cyclically operated in cooperation with the valve mechanism to compensate for the temporary presence of a power module passing through the transfer tank. The displacement device does this by first displacing a volume of water from the transfer tank. Specifically, this is done by pushing water from the transfer tank through the transfer port and into the return tank. At this time there is an unobstructed underwater pathway in the bi-level tank, and a power module is in the transfer tank. As the power module is leaving the transfer tank and is entering the return tank, a volume of water leaves the return tank and reenters the transfer tank. After the power module has departed the transfer tank, the valve mechanism is operated to again obstruct the water pathway, and the displacement device is operated to recover a volume of air $V_d$ into the transfer tank through the access port. In this exchange, the volume of water displaced into the return tank by the displacement device, and the volume of air $V_d$ recovered into the transfer tank by the displacement device are equal to the volume of a power module. Thus, water in the bi-level tank is moved back and forth between the transfer tank and the return tank to account for the passage of one power module through the transfer tank, and to accommodate the next power module in sequence. This is done with no loss of water from the bi-level tank. An important consequence of this is that the difference between respective levels of the upper and lower water surfaces is maintained.

A control unit is provided for the machine that will coordinate an operation of the valve mechanism with an operation of the displacement device as disclosed above. This requires external power from an available source. As envisioned for the present invention, the external power source will preferably be a commercial power grid. However, the electric generator that is driven by the machine of the present invention may itself be used as an alternative power source. In either case, an external source of power will be required to operate power-driven components of the machine, and to account for friction losses.

Ancillary components of the bi-level tank include a deflector/exit chute and a launch platform. Specifically, the deflector/exit chute is located at the top of the return tank and is used to reorient a power module as it exits the return tank. In the return tank, most of the closed-loop underwater pathway traveled by the power module needs to be vertically oriented. This vertical orientation, however, is inefficient for recovering a power module at the end of a duty cycle. For this reason, the deflector/exit chute is oriented to establish an exit angle $\Phi$ from vertical so that the exit momentum of a power module will be directed toward a launch platform as it emerges from the return tank. The exit angle $\Phi$ will preferably be in a range between 15°-20°.

In its relationship with the bi-level tank, the launch platform is positioned near the deflector/exit chute to receive a power module as it emerges from the return tank. In its relationship with the duty cycle of a power module, the launch platform is at the start point. Structurally, the launch platform is formed to receive, stabilize and hold the power module in a predetermined, near-horizontal, orientation on the launch platform. This orientation is then held until the power module is to be released to begin another duty cycle. For this purpose, the launch platform also includes a rotating mechanism that is power activated to rotate the launch platform and thereby release (i.e. drop) the power module. Upon its release from the launch platform it is important that the power module be in a vertical, upright orientation for subsequent engagement with the electric generator.

With a specific consideration now directed to the power module, it is important that the power module be buoyant, but that it also have the weight needed to do the work necessary to drive an electric generator (i.e. $\frac{1}{2}mv_e^2$). Within these constraints, weight W and buoyancy B are both forces that are constantly acting on a power module. Although W is constant, the buoyancy force B will change in both magnitude and direction during a duty cycle of a power module. Also, when a power module is moving, there will be a drag force D acting on the power module whose magnitude will depend on the velocity v of the power module. Accordingly, these interrelated forces require scrutiny.

By definition, weight W is the force acting on an object of mass m in the gravitational field. Weight is a constant and it is not affected by movements of the object. Moreover, weight always acts on an object in a downward direction toward the center of the earth. On the other hand, buoyancy is defined as the ability or tendency of an object to float in water or any other fluid. For objects in the earth's atmosphere (i.e. air), the buoyant force on heavier-than-air objects is typically ignored. This is not the case, however, when the object is submerged in water.

In general, there are several aspects of a buoyant force (B) that are particularly noteworthy. For one, the magnitude of a buoyant force is determined by the difference between the volume-weight (i.e. weight/volume) of an object, and the volume-weight of the fluid medium (e.g. water) that is displaced when the object is submerged in the fluid medium. Using the respective magnitude of B and W, a buoyancy factor can be determined. Mathematically, the buoyancy factor is a dimensionless ratio of the buoyant force (B) to the weight (W) of the object (i.e. the buoyancy factor=B/W). For this ratio the volume of the object and the volume of the displaced fluid medium (e.g. water) are equal. It is important to note that for the buoyancy factor, the density of the materials that are used for the manufacture of the object, and the shape of the object, are not factors in determining the object's buoyancy. Succinctly stated, it is only the volume of the object that matters.

The power module of the present invention is buoyant because it is engineered to be lighter than the volume of water it displaces in the bi-level tank. Thus, the materials used to provide strength and form for the power module are engineering design considerations. Preferably, the power module is designed to establish a buoyancy ratio (B/W), in water, that is in a range between 0.6 and 0.75.

As indicated above, whenever a power module moves, drag forces act to oppose the movement of the power module. Mathematically, a drag force D is expressed as Drag=D=$C_D \frac{1}{2} \rho v^2 S$. In this equation, $C_D$ is a dimensionless coefficient, $\rho$ is the density of the medium, v is the velocity of the object in the medium, and S is a function of the object's shape and cross-sectional area. The import here is that the drag force D is dependent on medium density, object velocity, and the design shape of the object. In the context of the present invention, the respective drag coefficients $C_{D(upper)}$ and $C_{D(lower)}$ have been discussed above with regard to the engineering effect they can have on movements of a power module through a bi-level tank.

According to an exemplary embodiment of the invention, an apparatus includes a volume of water confined by a bi-level tank adjustable between a return configuration and a reset configuration. The bi-level tank includes a transfer tank including an access port configured to open and close, a return tank extending upright from the transfer tank, and a transfer port between the transfer tank and the return tank and configured to open and close. The volume of water includes a transfer component in the transfer tank and defining a lower water surface under the access port, a return component extending upright through the return tank from the transfer port and the transfer component to an upper water surface above the lower water surface, and a transition component. A piston in the transfer component is below the transfer port. The piston includes an upper surface and a lower surface and is mounted for reciprocal movement between a lowered position and a raised position. A force-applying mechanism is operatively coupled to the piston. An extensible and retractable bellows coupled between the piston and the return tank extends upwardly through the transfer component between the upper surface and the return tank and couples the return component to the upper surface under pressure from the return component. An extensible and retractable boot over the bellows and coupled between the piston and the return tank extends upwardly through the transfer component. The boot defines a chamber charged with the transition component around the bellows between the upper surface and the return tank, is configured to maintain a constant volume of the chamber, and includes a first valve and a second valve each configured to open and close. The lower surface is under pressure from a pressurized fluid supplied by a source thereof. The return configuration includes the first valve closed for isolating the transition component from the transfer component, the second valve open for opening the transition component to the transfer component, the access port closed, and the transfer port open for opening the return component to the transfer component. The reset configuration includes the second valve closed for isolating the transition component from the transfer component, the first valve open for opening the transition component to the transfer component, the access port open, and the transfer port closed for isolating the return component from the transfer component. When the bi-level tank is in the return configuration and the piston is in the lowered position, the piston is configured to displace from the lowered position to the raised position, the bellow is configured to retract between the upper surface and the return tank, and the boot is configured to retract between the upper surface and the return tank while maintaining the constant volume of the chamber, for exchanging a first volume of the transfer component in the bellows with a second volume of the fluid from the source for lifting the first volume of the transfer component in the bellows into the return component in the return tank and sourcing the second volume of the fluid from the source to the lower surface of the piston in response to activating the force-applying mechanism for applying a force on the piston sufficient to defeat a pressure differential on the piston produced by the upper surface and the lower surface under concurrent pressures from the return component and the fluid, respectively. When the bi-level tank is in the reset configuration and the piston is in the raised position, the piston is configured to displace from the raised position to the lowered position, the bellow is configured to extend between the upper surface and the return tank, and the boot is configured to extend between the upper surface and the return tank while maintaining the constant volume of the chamber, for exchanging the first volume of the return component in the return tank with the second volume of the fluid sourced to the lower surface of the piston for lowering the first volume of the return component in the return tank into the transfer component in the bellows and returning the second volume of the fluid sourced to the lower surface of the piston to the source in response to deactivating the force-applying mechanism for removing the force from the piston for reestablishing the pressure differential on the piston. The return component is arranged about a first axis. The piston is mounted for reciprocal movement between the lowered position and the raised position along a second axis. The first axis is parallel to the second axis. The bellows is fashioned of Kevlar, ballistic nylon, blimp envelop material, or other material or combination of materials having inherently flexible, strong, cut-resistant, inelastic, non-stretchable, and fluid-impervious material characteristics. The boot is formed of a resilient elastomeric material. The source includes a pressure tank sourcing the pressurized fluid to the lower surface of the piston. The pressurized fluid is a pressurized gas.

According to another exemplary embodiment of the invention, an apparatus includes a volume of water confined by a bi-level tank adjustable between a return configuration and a reset configuration. The bi-level tank includes a transfer tank including an access port configured to open and close, a return tank extending upright from the transfer tank, and a transfer port between the transfer tank and the return tank and configured to open and close. The volume of water includes a transfer component in the transfer tank and defining a lower water surface under the access port, a return component extending upright through the return tank from the transfer port and the transfer component to an upper water surface above the lower water surface, and a transition component. A piston in the transfer component is below the transfer port. The piston includes an upper surface and a lower surface and is mounted for reciprocal movement between a lowered position and a raised position. A force-applying mechanism is operatively coupled to the piston. An extensible and retractable upper bellows coupled between the piston and the return tank extends upwardly through the transfer component between the upper surface and the return tank and couples the return component to the upper surface under pressure from the return component. An extensible and retractable boot over the upper bellows and coupled between the piston and the return tank extends upwardly through the transfer component. The boot defines a chamber charged with the transition component around the upper bellows between the upper surface and the return tank, is configured to maintain a constant volume of the chamber, and includes a first valve and a second valve each configured to open and close. An extensible and retractable lower bellows coupled to the piston extends downwardly through the transfer component from the lower surface and couples a fluid under pressure from a source thereof to the lower surface under pressure from the fluid. The return configuration includes the first valve closed for isolating the transition component from the transfer component, the second valve open for opening the transition component to the transfer component, the access port closed, and the transfer port open for opening the return component to the transfer component. The reset configuration includes the second valve closed for isolating the transition component from the transfer component, the first valve open for opening the transition component to the transfer component, the access port open, and the transfer port closed for isolating the return component from the transfer component. When the bi-level tank is in the return configuration and the piston is in the lowered position, the piston is configured to displace from the lowered position to the raised position, the lower boot is configured to extend from the lower surface, the upper bellows is configured to retract between the upper surface and the return tank, and the boot is configured to retract between the upper surface and the return tank while maintaining the constant volume of the chamber, for exchanging a first volume of the transfer component in the upper bellows with a second volume of the fluid from the source for lifting the first volume of the transfer component in the upper bellows into the return component in return tank and sourcing the second volume of the fluid from the source to the lower bellows in response to activating the force-applying mechanism for applying a force on the piston sufficient to defeat a pressure differential on the piston produced by the upper surface and the lower surface under concurrent pressures from the return component and the fluid, respectively. When the bi-level tank is in the reset configuration and the piston is in the raised position, the piston is configured to displace from the raised position to the lowered position, the lower boot is configured to retract toward the lower surface, the upper bellows is configured to extend between the upper surface and the return tank, and the boot is configured to extend between the upper surface and the return tank while maintaining the constant volume of the chamber, for exchanging the first volume of the return component in the return tank with the second volume of the fluid in the lower bellows for lowering the first volume of the return component in the return tank into the transfer component in upper bellows and returning the second volume from the lower bellows to the source in response to deactivating the force-applying mechanism for removing the force from the piston for reestablishing the pressure differential on the piston. The return component is arranged about a first axis. The piston is mounted for reciprocal movement between the lowered position and the raised position along a second axis. The first axis is parallel to the second axis. The upper bellows and the lower bellows are each fashioned of Kevlar, ballistic nylon, blimp envelop material, or other material or combination of materials having inherently flexible, strong, cut-resistant, inelastic, non-stretchable, and fluid-impervious material characteristics. The boot is formed of a resilient elastomeric material. The source includes a pressure tank sourcing the pressurized fluid to the lower bellows. The pressurized fluid is a pressurized gas.

BRIEF DESCRIPTION OF THE DRAWINGS

Specific objects and advantages of the invention will become apparent to those skilled in the art from the following detailed description of illustrative embodiments thereof, taken in conjunction with the drawings in which:

FIG. 6 is a table showing the correlation between a functional operation of the machine and the changeover operation of the valve mechanism of the present invention;

DETAILED DESCRIPTION

Figure 1:
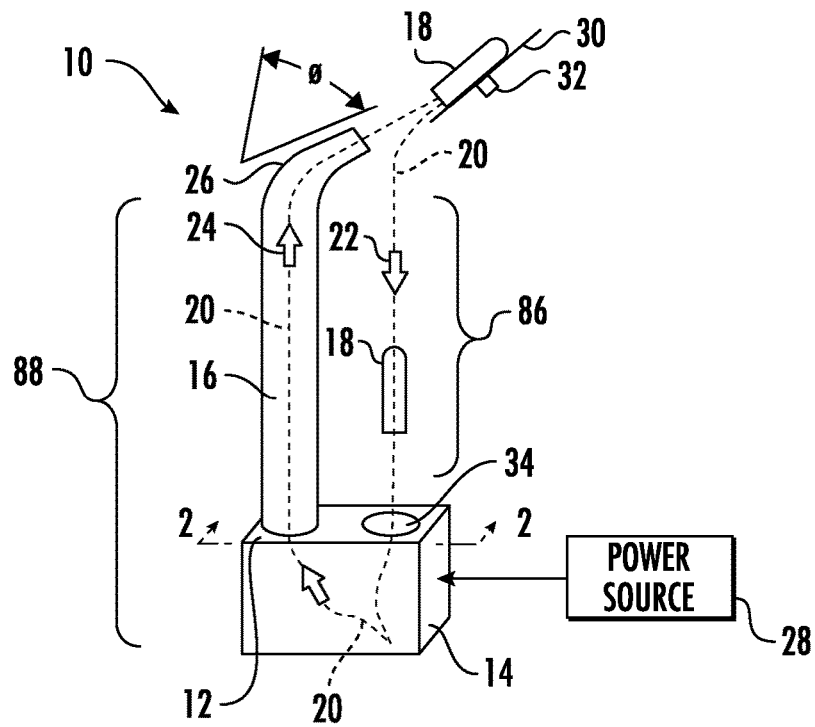
FIG. 1 is a perspective view of a machine for the present invention.

Referring to FIG. 1, a machine in accordance with the present invention includes a bi-level tank 12 adjustable between a return configuration and a reset configuration. The bi-level tank 12 confines a volume of water including a transfer component defining a lower water surface 42 of the volume of water and a return component defining an upper water surface 44 of the volume of water above the lower water surface 42. The bi-level tank 12 includes a lower transfer tank 14 holding the transfer component and an upper return tank 16 holding the return component. Return tank 16 and its contents extend upright from the transfer tank 14 and its contents. The transfer tank 14 includes an access port 34 and a transfer port 38 each configured to open and close. Return tank 16 is over and extends upright from the transfer port 38. The transfer component defines the lower water surface 42 of the volume of water under the access port 34. The return component extends upright through the return tank 16 from the transfer port 38 and the transfer component in transfer tank 14 to the upper water surface 44 of the volume of water. Machine 10 is configured to move a power module 18 through a duty cycle on a closed-loop pathway designated by dashed line 20 in FIG. 1. The duty cycle on pathway 20 includes a DOWN portion, indicated by arrow 22, and an UP portion, indicated by the arrow 24. A deflector/exit chute 26 connected to the top of the return tank 16 directs the power module 18 as it exits the bi-level tank 12. As will be appreciated with the additional disclosure presented below, an important consideration for the machine 10 is that it requires an external power source 28 for its operation. As envisioned for the present invention, the external power source 28 can be any such source well known in the art, such as a power grid provided by a commercial power company or some other external generator.

Figure 2A:
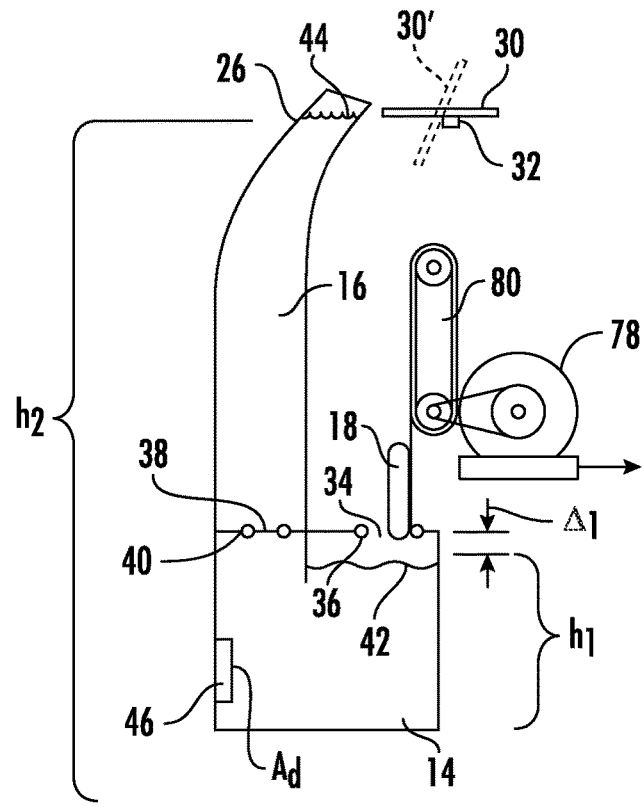
FIG. 2A is a cross-section view of the machine as seen along the line 2-2 in FIG. 1, when the machine is configured to receive a power module.

Additional aspects of the bi-level tank 12 will be appreciated with reference to FIG. 2A illustrating a launch platform 30 positioned above the transfer tank 14 at a location near the deflector/exit chute 26 of the return tank 16. At this location, the launch platform 30 is positioned to receive a power module 18 as it exits from the return tank 16 through the deflector/exit chute 26 at the end of a duty cycle. A rotating mechanism 32 is provided for the launch platform 30. When a power module 18 is received by the launch platform 30, it will be held on the launch platform 30 until the rotating mechanism 32 is activated to move the launch platform to an orientation indicated for launch platform 30'. The power module 18 will then be dropped from the launch platform 30'. After a power module 18 has been dropped, the orientation for launch platform 30 is reassumed to receive the next power module 18 in sequence. It is to be noted that an operation of the launch platform 30 requires power from the external power source 28.

Still referring to FIG. 2A, it will be seen that the transfer tank 14 includes an access port 34 above lower water surface 42 and which can be closed or opened by an access valve 36 and a transfer port 38 which can be closed or opened by a transfer valve 40. Transfer port 38 is between the transfer tank 14 and the return tank 16 extending upright therefrom. Because the access valve 36 and the transfer valve 40 must perform a changeover operation with each other, the valves are sometimes referred to, collectively in this disclosure, as a valve mechanism 36/40.

Figure 2B:
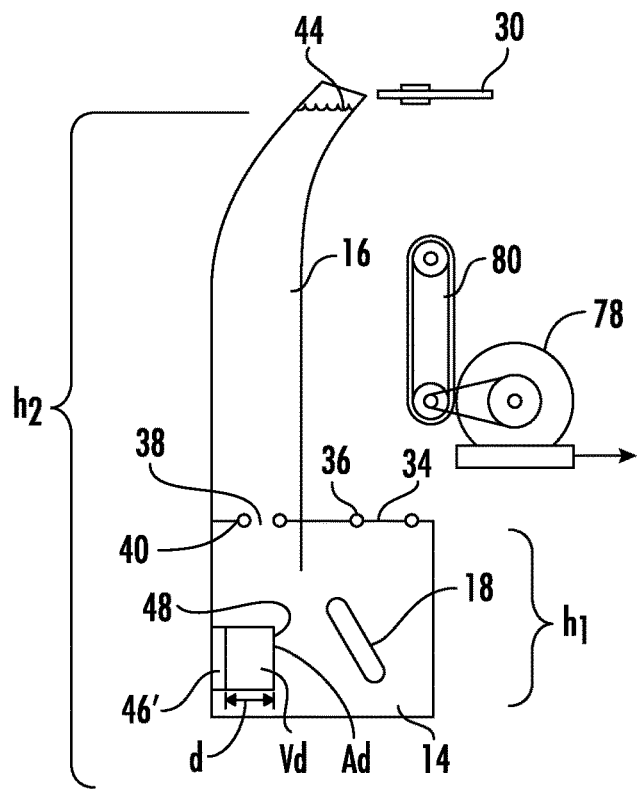
FIG. 2B is a view of the machine as shown in FIG. 2A when the machine is configured to reorient the power module in the transfer tank of the present invention.
Figure 2C:
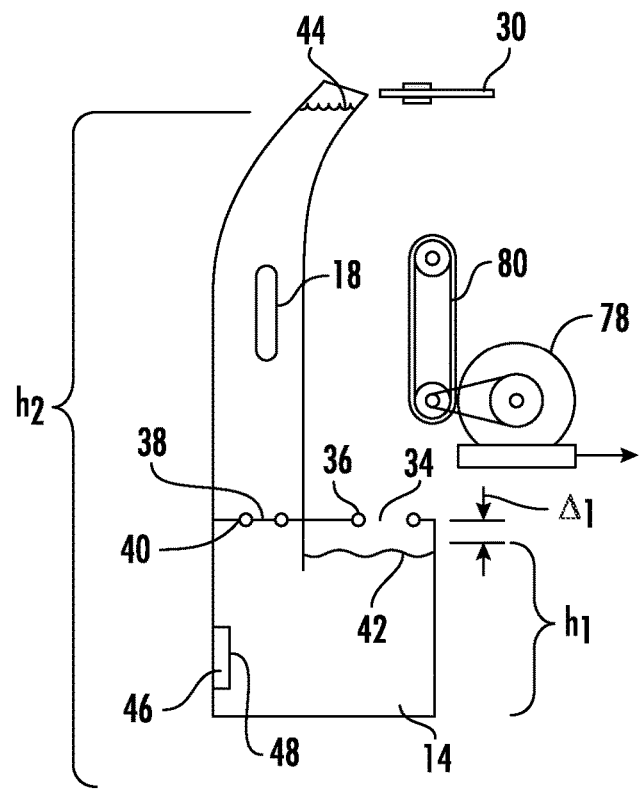
FIG. 2C is a view of the machine as shown in FIG. 2A after the power module has passed through the transfer tank and the transfer tank has been reconfigured to receive the next successive power module.

An operation of the valve mechanism 36/40, and its import for an operation of the machine 10, will be best appreciated with a successive consideration of FIGS. 2A, 2B and 2C. In FIG. 2A, it will be noted that the valve mechanism 36/40 is configured so that the access port 34 is open and the transfer port 38 is closed. With this starting configuration for the valve mechanism 36/40, the transfer tank 14 is isolated from the return tank 16 isolating the transfer component in the return tank 14 from the return component in the return tank 16 and there is no fluid communication between the transfer component in the transfer tank 14 and the return component extending upright through the return tank 16 from the transfer tank 14 and the closed transfer port 38 to the upper water surface 44. Also, the lower water surface 42 of the transfer component in the transfer tank 14 is exposed to only the atmosphere. The consequence of this configuration of the bi-level tank 12 is that a power module 18 can enter the transfer tank 14 through the open access port 34. Moreover, the kinetic energy of the power module 18 ($\frac{1}{2}mv^2$) must only do work against an exposed lower water surface 42 that experiences a head height $h_1$, which is directly influenced by only the atmosphere.

In FIG. 2B the valve mechanism 36/40 is shown configured with the access port 34 closed and the transfer port 38 open in the return configuration of the bi-level tank 12. With this configuration for the valve mechanism 36/40 setting the bi-level tank 12 to its return configuration, the transfer tank 14 is open to the return tank 16 opening the transfer component in the transfer tank 14 to the return component extending upright from the transfer component and the now open transfer port 38 to the upper water surface 44. This establishes an unobstructed underwater pathway 20 from the transfer component in the transfer tank 14, through the return component of the return tank 1, and up to the atmospherically exposed water surface 44 of the return component. At this point however, although transfer component in the transfer tank 14 is subjected to an increased head height $h_2$, it is to be appreciated there is no adverse operational effect on the power module 18. In their relationship to each other, $h_2 \gg h_1$.

For the next successive configuration for the valve mechanism 36/40, FIG. 2C shows that the access port 34 has been opened and the transfer port 38 has been closed. This changeover operation puts the bi-level tank 12 to its reset configuration for receiving a next module 18 into the transfer tank 14. In accordance with the present invention, the successive configurations of valve mechanism 36/40 are repeated for each duty cycle of the power module 18.

As disclosed above, the valve mechanism 36/40 maintains different levels for the water surface 42 of the transfer component and the water surface 44 of the return component in the bi-level tank 12. Valve mechanism 36/40 operates to changeover the open and closed condition of the access port 34 and the transfer port 38 in the bi-level tank 12. For this purpose, the selection of a specific type valve mechanism 36/40 for each machine 10 will depend on the operational requirements of the machine 10 that is being constructed (e.g. structural strength required, size, timing and output power requirements). Thus, although many valve types can be considered for use with the machine 10, the selection of a particular valve type for the valve mechanism 36/40 is a design and engineering consideration that can, and often will, require an evaluation of many different types of valves; to include: globe valves, butterfly valves, gate valves, slide valves, ball valves, check valves, diaphragm valves, plug valves and pinch valves.

In general, the operation of a displacement device 46 in accordance with the present invention will be best appreciated with reference to FIGS. 2B and 2C. In FIG. 2B, the bi-level tank 12 is shown configured after a power module 18 has entered the transfer tank 14. Specifically, for this configuration the access port 34 is closed and the transfer port 38 is open setting bi-level tank 12 to its return configuration. At this point in a duty cycle, the water pathway 20 from the transfer tank 14 into the return tank 16 is unobstructed by the transfer valve 40 at the now open transfer port 38. It is also important to recognize that in FIG. 2B, the displacement device 46' has been activated while the power module 18 is in the transfer tank 14, which is the same for the alternate embodiment of a displacement device 100 discussed below in conjunction with FIGS. 9-14.

Structurally, the activated displacement device 46' occupies a displacement volume $V_d$ in the transfer tank 14 that is equal to the volume $V_m$ of the power module 18 ($V_d = V_m$). Displacement device 46 is configured to cyclically displace displacement volume $V_d$ between the transfer and return components. To establish this relationship, a surface 48 of the displacement device 46, having a flat projection displacement area $A_d$, has been moved into the transfer tank 14 through a displacement distance d (i.e. $V_d = A_d d$). The result here is that in addition to the presence of a power module 18 of volume $V_m$ in the transfer tank 14, a volume of water equal to $A_d d$ (i.e. $V_d$) has been displaced from the transfer tank 14 and moved into the return tank 16. Since $V_d = V_m$, the total water displaced from the transfer tank 14 for the configuration of the bi-level tank 12 shown in FIG. 2B, is $V_d + V_m = 2V_m$.

In FIG. 2C, the power module 18 has progressed from the transfer tank 14 and into the return tank 16. Also, the displacement device 46 has been deactivated to remove a volume $V_d$ of water from the transfer component in the transfer tank 14 and lift it into the return component of the return tank 16. The configuration of the bi-level tank 12 has also been changed to open the access port 34 and close the transfer port 38. The consequence of this is that the power module volume $V_m$ has moved into the return tank 16. Also, the displacement volume $V_d$ has been removed by a deactivated displacement device 46 to recover a volume of air $V_d$ into the transfer tank 14 that is equal to $V_m$. The result here is that the bi-level tank 12 has been reconfigured or otherwise reset to receive the next successive power module 18 (see FIG. 2A).

A displacement device 46 can have any one of several different structures. Accordingly, each structure will have correspondingly different components. It is possible that the displacement device 46 may be either pneumatically activated, mechanically activated or activated by a structure that requires both pneumatic and mechanical activation. For instance, as a pneumatic device, the displacement device 46 may employ compressed air to operate pressurized bellows or an inflatable bladder. On the other hand, for a mechanical device the displacement device 46 may employ a piston component that is activated by an electromagnetic drive, an electric drive or a mechanical drive. Stated differently, the present invention recognizes the possibility that different drive components may be employed to operate a displacement device 46 for the purposes of the present invention. In any case, it is necessary for the displacement device 46 to first displace a volume of water $V_d$ from the transfer tank 14 as disclosed above. Then, the displacement device 46 needs to be timely activated in cooperation with the valve mechanism 36/40 to recover a same volume of air $V_d$ into the transfer tank 14, as also disclosed above.

Figure 3A:
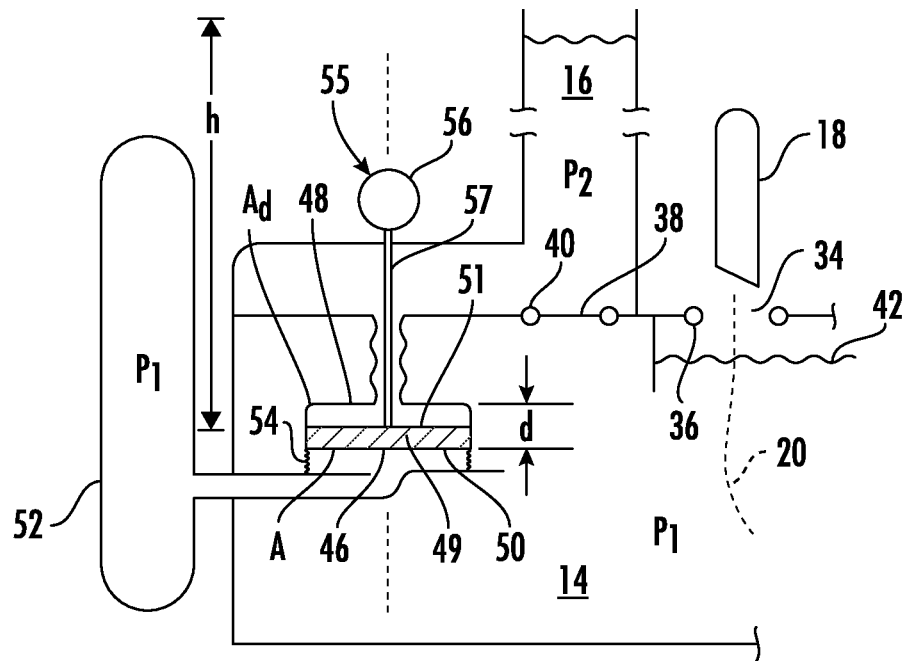
FIG. 3A is a cross-section view of a displacement device for use with the present invention, with the displacement device shown in a deactivated configuration.
Figure 3B:
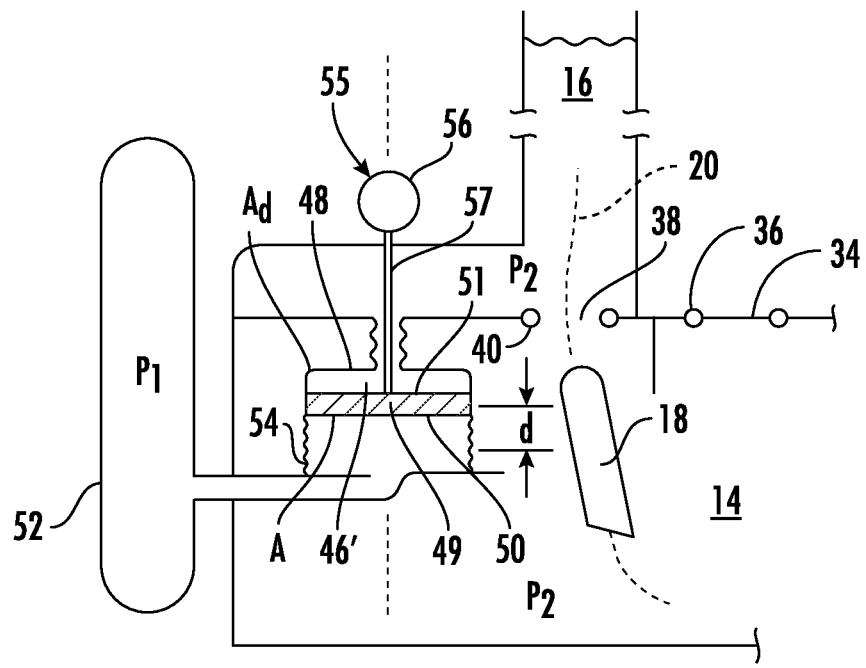
FIG. 3B is a view of the displacement device as shown in FIG. 3A, with the displacement device in an activated configuration.

With reference to FIGS. 3A and 3B, a displacement device 46 submerged in the transfer tank 14 of bi-level tank 12 is shown in a configuration where it is deactivated. The bi-level tank 12 is adjustable between the previously-described return configuration and the reset configuration and confines the volume of water including the transfer component in the transfer tank 14 and the return component in the return tank 16. In this embodiment, an extension 16A of return tank extends over part of transfer tank 14 over displacement device 46 submerged in the transfer component. As shown, the displacement device 46 has an outside upper surface 48, and it includes a piston 49 under and laterally offset from the transfer port 38 directly under the upwardly-extending return tank 16 and its return component. Piston 102 includes downwardly-facing lower surface 50 and upwardly-facing inside upper surface 51. Also, FIG. 3A indicates that the lower surface 50 of the piston 49 has a surface area A that is in fluid communication with a pressure tank 52 which holds compressed air at a pressure $p_1$ against piston's 49 lower surface 50. Thus, the lower surface 50 of the piston 49 will constantly be subject to or otherwise under a pressure of approximately $p_1$ that exerts a force equal to $p_1 A$ on the lower surface 50. Further, FIG. 3A indicates that the inside upper surface 51 of the piston 49 is in fluid communication with the return tank 16 and it will thereby be constantly subject to or otherwise under a pressure $p_2$ from the return component in the return tank 16.

Still referring to FIG. 3A, a bellows 54 surrounds the lower surface 50 of the displacement device 46 and interconnects the displacement device 46 with the pressure tank 52. Further, the displacement device 46 is shown to be mechanically connected directly to a force-applying mechanism 55, in this example a force actuator 56 that is external to the transfer tank 14 and operatively coupled to the piston 49 by a cable 57.

At this point in the duty cycle of a power module 18, in order to displace a volume of water $V_d$ from the transfer tank 14, and to move it into the return tank 16, the outside upper surface 48 of the displacement device 46 must act against the water pressure $p_2$ caused by the head height $h_2$ in the transfer tank 14. In this case, the work required to displace $V_d$ will be equal to the product of the projected displacement area $A_d$ for the upper surface 48 of the displacement device 46, the pressure $p_2$ in the return tank 16, and the displacement distance d that is required for a movement of the displacement device 46 to create a volume $V_d$ (i.e. $A_d p_2 d$).

In a preferred embodiment for the displacement device 46, fluid pressure $p_1$ from pressure tank 52 is established in fluid communication with the lower surface 50 of the piston 49 of the displacement device 46. This pressure $p_1$ on the lower surface 50 of piston 49 will act directly against the area A of the lower surface 50 and thereby create a biasing force $Ap_1$. This biasing force $Ap_1$ will then directly oppose the force $A_d p_2$ that acts against the upper surface 48 of the displacement device 46. Since the inside upper surface 51 of the piston 49 will be subject to the pressure $p_2$, a structure is created where the only pressure forces acting on the displacement device are $p_1$ and $p_2$. Within this structural combination, the pressure $p_2$ that is due to head height $h_2$ in the return tank 16 and the pressure $p_1$ from the pressure tank 52 can be respectively used to create a pressure differential $\Delta p = p_2 - p_1$, wherein $p_2 > p_1$. Thus, a force that is proportional to $\Delta p$ will always act against the displacement device 46 to urge the displacement device 46 into its deactivated configuration. It is also to be appreciated that other devices can be used to create the bias force. For instance, instead of using compressed air, a spring can be used with an appropriate spring constant to establish Δp. Further, the use of a counteracting water column is possible. For example, water pressure from the return tank 16 can be directed against the lower surface 50 of the piston 49 to create Δp.

In any event, it is important that the bias force create a Δp that is relatively small, e.g. in a range between 1.5 and 2 psi. Accordingly, an activating force from the force actuator 56 that will raise the displacement device 46 through a distance d, against the force $A_d p_2 d$ that is caused by water in the transfer tank 14, need only be greater than $A_d \Delta p$. Preferably, the force actuator 56 of the force-applying mechanism 55 is a motorized winch-type motor operatively connected by the cable 57 with the inside upper surface 51 of the piston 49.

Figure 4A:
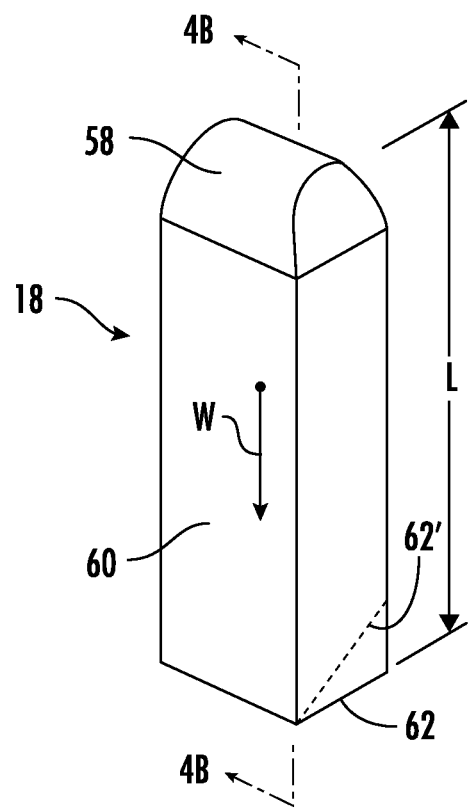
FIG. 4A is a perspective view of a power module in accordance with the present invention.
Figure 4B:
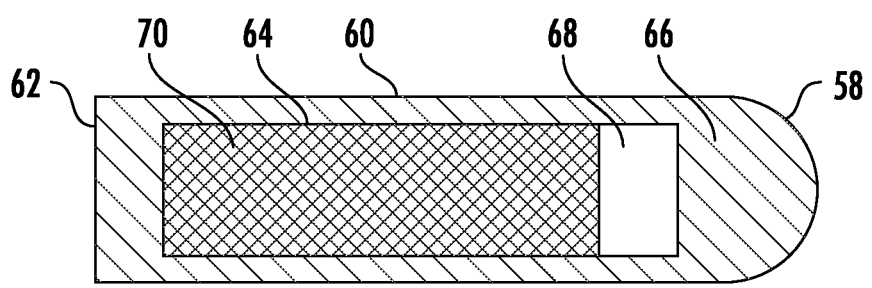
FIG. 4B is a cross-section view of the power module as seen along the line 4B-4B in FIG. 4A.

The power module 18 shown in FIGS. 4A and 4B is exemplary of a preferred structure for the power module 18 of the present invention. As shown, the power module 18 has an upper end 58, a body 60 and a lower end 62. Further, FIG. 4A shows that the lower end 62 can be modified for hydrodynamic purposes, such as by being slanted as shown by the dashed line for the lower end 62'. Depending on engineering design considerations, the length L of the power module 18 can be varied. Operationally, the power module 18 remains upright, i.e. with the upper end 58 remains above the lower end 62, during an entire duty cycle of the power module 18.

FIG. 4B, shows that the interior of a power module 18 will include an enclosed chamber 64 that is surrounded by a structure 66. This structure 66 will preferably be a strong heavy material, such as a metal, that is formed to create the exterior surface of the power module 18. For purposes of the present invention, the power module 18 will have weight W and a volume $V_m$.

As emphasized above, it is an important design consideration for the present invention that the power module 18 be buoyant. For this consideration, the weight W and the volume $V_m$ are constant, and are predetermined. Thus, the buoyancy of the power module 18 must consider the weight that is added by components put into the chamber 64. For instance, it is envisioned that the chamber 64 will include a compartment 68 for holding electronics (e.g. sensors) and possibly magnets (not shown). Also, if necessary, materials including a support grid 70 can be erected in the interior of the chamber 64 for added strength and rigidity. In any event, as disclosed above, the power module 18 must be buoyant, and have a buoyancy factor that is preferably in a range between 0.6 and 0.75.

Figure 5:
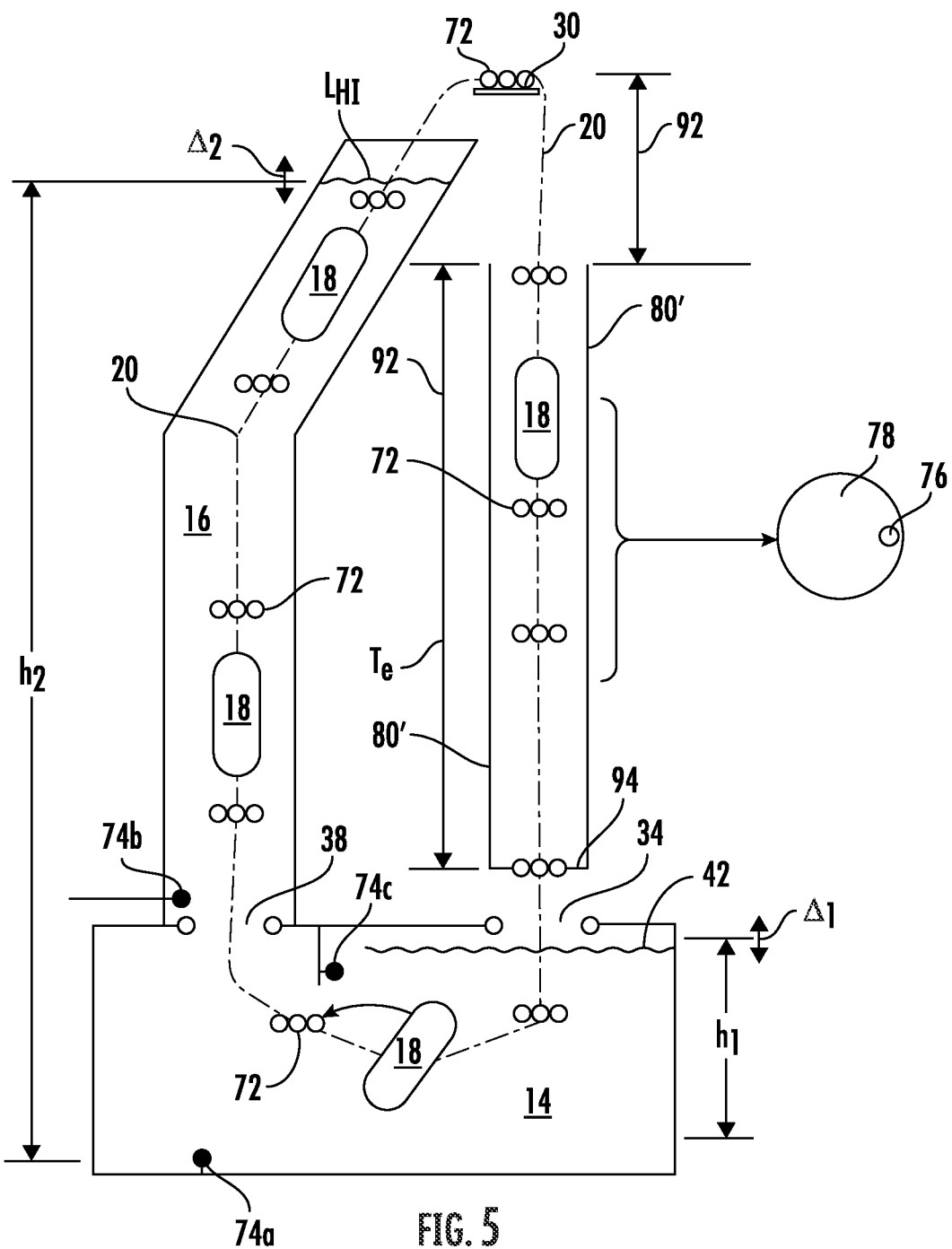
FIG. 5 is a cross-section view of the machine of the present invention showing a positioning of velocity and hydrodynamic sensors on the machine.

In accordance with above disclosure, and with reference to FIG. 5, it will be appreciated that an operation of the present invention requires precise velocity control over each power module 18 during its duty cycle. Preferably, by way of example, the present invention will involve a multi-module machine 10 that simultaneously uses four power modules 18. For purposes of the present invention, a plurality of position/velocity control sensors 72 are variously mounted on the machine 10. Additionally, a plurality of hydrodynamic sensors 74 are submerged in the bi-level tank 12. Further, FIG. 5 shows that an output power gauge 76 is mounted on an electric generator 78 that is connected with a linear drive component 80. As envisioned for the present invention, the linear drive component 80 may be either a mechanical chain drive, as show in FIGS. 2A-C, or it can be an electro-magnetic solenoid 80', as shown in FIG. 5. With either structure, it is important that the power module 18 be securely engaged with the linear drive component 80/80' as its kinetic energy is used to drive the electric generator 78.

The plurality of position/velocity sensors 72 are specifically located on the machine 10 to measure positions and velocities of each power module 18 as it passes selected points in the bi-level tank 12 during its respective duty cycle. Preferably, at least one position/velocity sensor 72 is positioned at the launch platform 30 to determine when a power module 18 is ready for launch. At least one position/velocity sensor 72 is located on the DOWN portion of the closed-loop pathway 20 to monitor the velocity $v_e$ of power modules 18 while they are driving the electric generator 78 by their engagement with a linear drive component 80 for the electric generator 78.

Also, a plurality of position/velocity sensors 72 are positioned in the bi-level tank 12. More specifically, position/velocity sensors 72 are positioned in the transfer tank 14 to monitor the transfer of a power module 18 from the transfer tank 14 into the return tank 16. Further, position/velocity sensors 72 are positioned in the return tank 16 to ensure appropriate duty cycle locations for power modules 18 on the UP portion of the closed-loop pathway 20 in preparation for a subsequent exit from the return tank 16.

The plurality of hydrodynamic sensors 74 are submerged in the bi-level tank 12 to measure fluid characteristics of the water in the bi-level tank 12. In particular, at least one hydrodynamic sensor 74a records fluid pressure in the transfer tank 14 when the access port 34 is open and the transfer port 38 is closed. At least one other hydrodynamic sensor 74b records fluid pressure in the transfer tank 14 when the access port 34 is closed and the transfer port 38 is open. And, at least one hydrodynamic sensor 74c records fluid pressure in the transfer tank 14 to monitor variations $\Delta_1$ in the lower level water surface 42 of the transfer tank 14. The general purpose here is to provide hydrodynamic values that can affect the velocity of a power module 18 in the bi-level tank 12, and to provide information to a control unit 82 (see FIG. 8) pertaining to the level of the lower water surface 42 and the level of the upper water surface 44 together with their respective variations $\Delta_1$ and $\Delta_2$ that are needed for a timely operation of the valve mechanism 36/40. Additionally, the hydrodynamic sensors 74 in the transfer tank 14 provide important information to the control unit 82 regarding fluid pressure values in the transfer tank 14 that must be accounted for during a proper operation of the displacement device 46.

With reference to FIG. 6, the required operation of the valve mechanism 36/40 with the operation of the displacement device 46 is provided for reference purposes. Specifically, FIG. 6 correlates a functional operation of the machine 10 with the changeover required for an operation of the valve mechanism 36/40, and the corresponding configurations of the access port 34 and the transfer port 38. As disclosed above, a valve mechanism 36/40 is provided for maintaining different water surface levels in the bi-level tank 12. On the other hand, the displacement device 46 is required to accommodate the passage of a power module 18 through the transfer tank 14. The displacement device 46 is activated when the access port 34 is closed and the transfer port 38 is open. Furthermore, the displacement device 46 is deactivated when the access port 34 is open and the transfer port 38 is closed.

Figure 7:
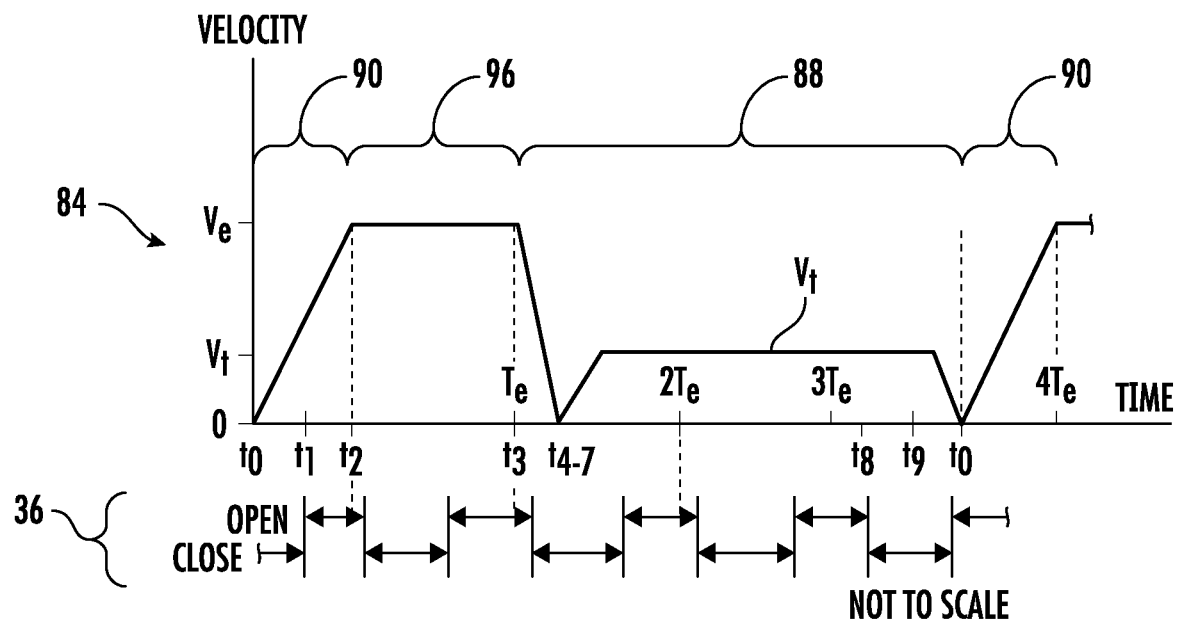
FIG. 7 is a velocity profile for a single power module during a duty cycle in accordance with an operation of the machine wherein four power modules are used, with a corresponding reference for each successive three power modules identified relative to the first power module.

Operational control for the machine 10 will be best appreciated with reference to FIG. 7, where the velocity profile of an exemplary duty cycle 84 for one power module 18 is presented. FIG. 7, shows this duty cycle 84 in a context with the operation of the valve mechanism 36/40. When access valve 36 is open, transfer valve 40 will be closed and vice versa. Moreover, in FIG. 7, the duty cycle 84 for a single power module 18 is shown in a relation of its engagement time $T_e$ with the electric generator 78 and the engagement times 2-4 $T_e$ for three additional power modules 18.

With reference to the timeline in FIG. 7, it is to be appreciated that a duty cycle 84 can be considered as extending from $t_0$ to $t_0$. In this case, the engagement time $T_e$ (see FIG. 5) will extend from $t_2$ to $t_3$. For a four-module machine 10, as shown in FIG. 5, a complete duty cycle 84 for each power module 18 will have a duration equal to 4 $T_e$.

With the above in mind, the positions and velocities of each power module 18 as it travels through a duty cycle 84 must necessarily be based on $T_e$. Also, as discussed above, there are two velocities in a duty cycle 84 that will remain substantially constant. First, the engagement velocity Ve that a power module 18 has during a power phase 86 (see FIG. 1) of the duty cycle 84 needs to be constant during the time $T_e$. Specifically, Ve is constant while the power module 18 is engaged with the linear drive component 80 of the electric generator 78. Second, the velocity $v_t$ which is the terminal velocity attained by the power module 18 as it rises in the return tank 16, during a return phase 88 of the duty cycle 84, will remain constant. Module velocities other than $v_e$ and $v_t$ are transitional velocities which will either accelerate to $v_e$ or $v_t$; or decelerate from $v_e$ or $v_t$ to zero.

FIG. 7 shows that from the time to when a power module 18 is dropped for free fall 90 from the launch platform 30 until it engages with the linear drive component 80 at time $t_2$, the velocity of a power module 18 increases from zero to $v_e$. For the present invention, $v_e$ will depend on the weight W of a power module 18, as well as the free fall distance 92 (see FIG. 5). Importantly, $v_e$ for a power module 18 is established so it will generate the voltage and sine wave characteristics that are required by the end user (e.g. a commercial grid). Operationally, $v_e$ can be controlled by control unit 82 using output from power gauge 76 to determine appropriate loading for the linear drive component 80.

As shown, $v_e$ is held constant between $t_2$ and $t_3$ for a time interval $T_e$. At the time $t_3$, as a power module 18 disengages from the linear drive component 80, the next successive power module 18 will simultaneously engage with the linear drive component 80. Also, it is important to note that at the time $t_3$, the access port 34 will be open to allow the disengaged power module 18 to enter the transfer tank 14. At this time, the transfer port 38 will accordingly be closed. As a safety feature, in order to ensure that access port 34 is indeed open, a mechanical trip switch 94 (see FIG. 5) can be provided at a predetermined distance above the access port 34. Shortly after $t_3$, however, i.e. once the power module 18 has entered the transfer tank 14, access port 34 closes and transfer port 38 opens.

Once the power module 18 is in the transfer tank 14, the displacement device 46 is activated to force a volume of water $V_d$ from the transfer component in the transfer tank 14 to the return component of the return tank 16 through the now-open transfer port 38. Specifically, as noted elsewhere herein, this displaced volume $V_d$ of water will be equal to the volume $V_m$ of the power module 18 that is in the transfer tank 14 at the time.

While it is inside the transfer tank 14, the power module 18 will decelerate to zero (v=0). Then, as it is being reoriented in the transfer tank 14, the power module 18 will accelerate to its terminal velocity $v_t$ as it transitions from the transfer tank 14 and into the return tank 16. It is important that the power module 18 leave the transfer tank 14 within the time interval $T_e$ so the next power module 18 will be able to enter the transfer tank 14 during its respective duty cycle 84.

Still referring to FIG. 7 it will be appreciated that a power module 18 will maintain its terminal velocity $v_t$ in the return tank 16 until it exits from the return tank 16. Before starting its next duty cycle 84, the power module 18 will decelerate from $v_t$ to zero. Deceleration is then complete when the power module 18 is repositioned on the launch platform 30 to begin its next duty cycle 84 with another free fall 90.

With reference to FIG. 7, the above disclosure has been described in terms of a duty cycle 84 for only one power module 18. As has been noted, however, for an operation that involves a plurality of power modules 18 (e.g. four), each power module 18 will experience a same duty cycle 84. Moreover, each power module 18 will be engaged with the linear drive component 80 for a same time interval $T_e$. Thus, in this example the time duration of the duty cycle 84 for each power module 18 will be 4 $T_e$.

As envisioned for the present invention, it may be desirable for there to be a plurality of power modules 18 concurrently engaged with the linear drive component 80. In this case, the time each power module 18 is reoriented in the transfer tank 14 will necessarily be shortened since there can only be one power module 18 at a time in the transfer tank 14.

Figure 8:
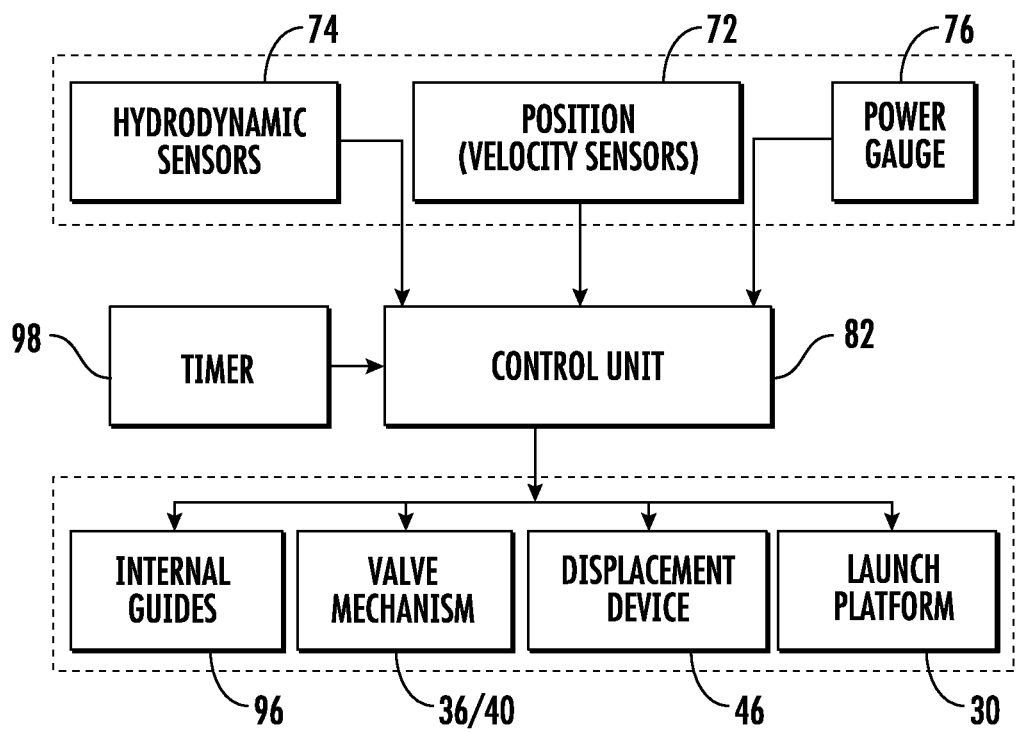
FIG. 8 is a diagram of interconnected components required for operating and controlling an operation of the present invention.

Another consideration for the structure of a machine 10 is the incorporation of internal guides 96 that are referred to in FIG. 8. These guides can be positioned along the closed-loop pathway 20 to establish and maintain a controlled movement of the power module 18 through the machine 10 to include engagement with the electric generator 78 and a reorientation of the power module 18 in the transfer tank 14. For this purpose, internal guides 96 can be positioned along the portion of closed-loop pathway 20 where power modules 18 engage with the linear drive component 80 of electric generator 78. Internal guides 96 can also be appropriately positioned in the bi-level tank 12. The particular structures used for internal guides 96 will depend primarily on engineering design criteria, the size and shape of power modules 18, and the operational requirements for a machine 10. With this in mind, internal guides 96 will typically be rollers, rails, bulkheads, barriers, restraints, magnets, or a combination of these various structures.

Referring now to FIG. 8, it will be seen that the control unit 82 is connected in electronic communication with a timer 98 and with other electronic and mechanical components of the machine 10. Specifically, the control unit 82 uses the timer 98 to coordinate the operation of the various system components. In particular, these components include the launch platform 30, the displacement device 46 and the valve mechanism 36/40. They also include the internal guides 96 that assist in keeping power modules 18 on the closed-loop pathway 20 during a duty cycle 84.

Figure 9:
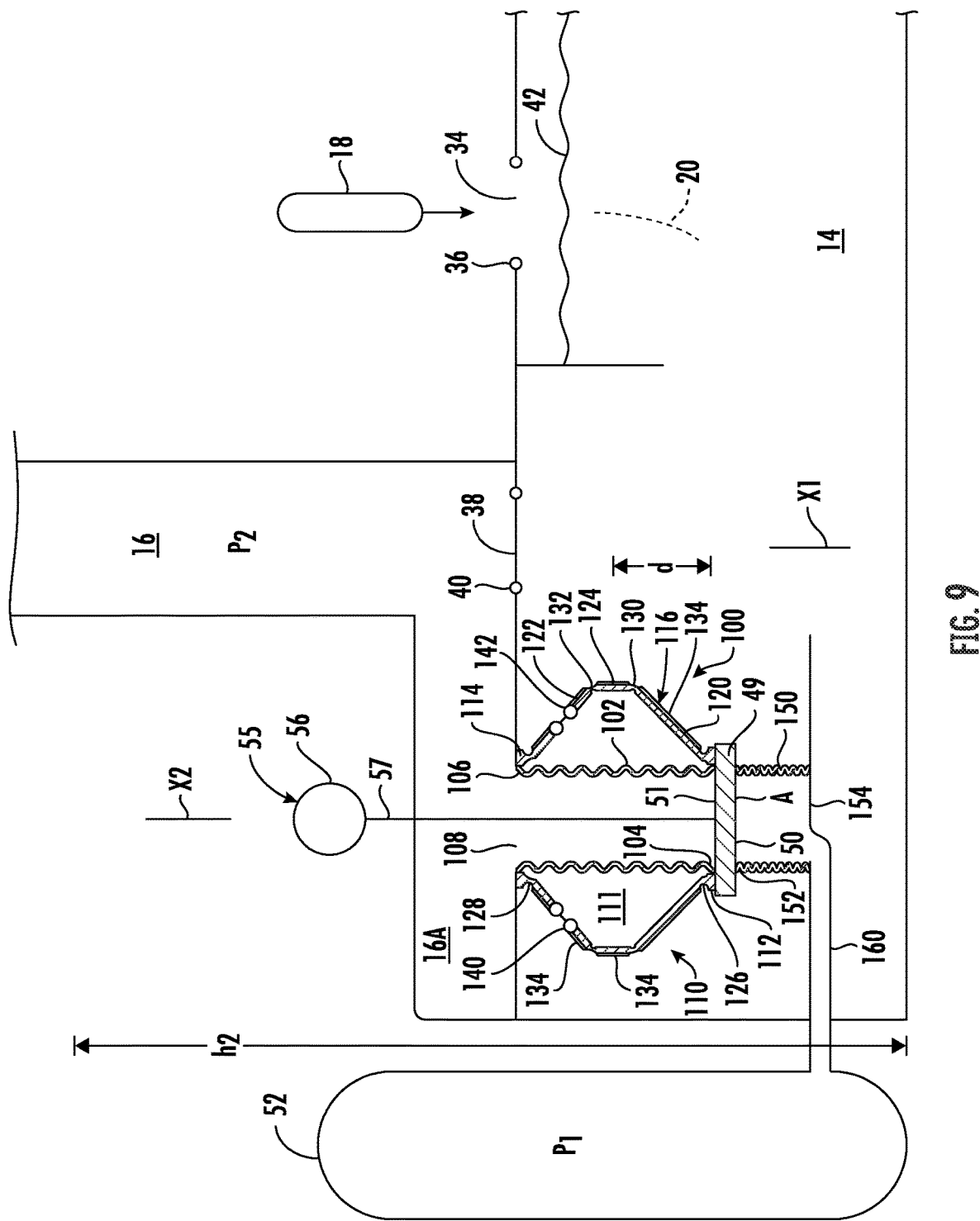
FIG. 9 is a cross-section view like FIG. 3A illustrating an alternate embodiment of a displacement device for use with the present invention.

FIG. 9 is similar to FIG. 3A and illustrates the bi-level tank 12 configured with an alternate embodiment of a displacement device 100. The bi-level tank 12 incorporating the displacement device 100 confines the volume of water and adjusts or cycles between return and reset configurations. The displacement device 100 is configured to repeatedly displace between a deactivated configuration and an activated configuration for displacing a volume of water $V_d$ between the transfer component in the transfer tank 14 and the return component of the return tank 16. The displacement device 100 is un-displaced when deactivated to its deactivated position. The displacement device 100 is displaced when activated to its activated position.

The bi-level tank 12 includes the previously-described transfer tank 14, the return tank 16 extending upright from the transfer tank 14, the access port 34 configured to open and close by access valve 36, and the transfer port 38 configured to open and close by transfer valve 40. The volume of water includes the transfer component in the transfer tank 14, the return component in the return tank 16, and, according to this embodiment, a transition component in and managed by the displacement device 100. The transfer component defines the lower water surface 42 under the access port 34. The return component extends upright through the return tank 16 from the transfer port 38 and the transfer component 14 to the upper water surface (See FIG. 2A) above the lower water surface 42. The return tank's 16 extension 16A extends over part of the transfer tank 14 over the displacement device 100 submerged in the transfer component in the transfer tank 14 and shown deactivated.

The displacement device 100 operates to displace volume $V_d$ between the transfer and return components cyclically during each duty cycle. The displacement device 100 includes the previously-described piston 49 in the transfer component below and laterally offset from the transfer port 38 directly under the upwardly-extending return tank 16 and its return component contents. The piston 49 includes the downwardly-facing lower surface 50 and the upwardly-facing upper surface 51, and mechanically and operatively connected to the previously described force-applying mechanism 55. The return component and the transfer tank 16 are arranged about upright axis X1. Piston 49 is mounted for reciprocal movement along axis X2 between a lowered position in FIGS. 9, 10, and 14, and a raised displaced position in FIGS. 12 and 13. Axis X1 is parallel to axis X2.

An extensible and retractable bellows 102 is coupled between the piston 49 and the return tank 16 at return tank's 16 extension 16A. The bellows 102, the upper bellows of the displacement device 100, is a tubular concertina bellows made of Kevlar, ballistic nylon, blimp envelop material, or other material or combination of materials having inherently flexible, strong, cut-resistant, inelastic, non-stretchable, and fluid-impervious material characteristics. The transfer component fills the bellows 102 extending upwardly through the transfer component between the upper surface 51 of the piston 49 and the return tank's 16 extension 16A. The bellows 102 opens the upper surface 51 and the water in the bellows 102 to the return component fluidly coupling the return component to the piston's 49 transfer component contents and the upper surface 51 under pressure $p_2$ from the return component.

The bellows 102 includes an open lower end 104 centered on and affixed to piston's 49 upper surface 51 and extends upright from the upper surface 51 to an open upper end 106 affixed to the transfer tank 14 around a displacement port 108 of the transfer tank 14 that is open to the return tank 16 at its extension 16A. The open lower end 104 is open to the upper surface 51 of the piston 49 and open upper end 106 that is open to the return tank 16 and its return component contents via the displacement port 108. This fluidly couples the return tank 16 and its return component to the bellows 102, the transfer component in the bellows 102, and the upper surface 51. The transfer component in the bellows 102 and piston's 49 upper surface 51 are under pressure $p_2$ from the return component that communicates fluidly with the bellow's 102 transfer component extending downwardly therethrough from the open upper end 106 at the port 108 to the lower open end 104 and the piston's 49 upper surface 51.

An extensible and retractable constant volume boot 110 is over the bellows 102 and coupled between the piston 49 and the return tank 16. The boot 110, a housing, surrounds the bellows 102 between the open lower end 104 and the open upper end 106. The boot 100 extends upwardly through the transfer component between the piston's 49 upper surface 51 and the transfer tank 14. The boot 110 defines a chamber 111, a fluid chamber, charged with the transition component around the bellows 102 between the upper surface 51 of the piston 51 and the return tank 16. The boot 110 is configured to maintain a constant volume of chamber 111 and its transition component contents.

Figure 10:
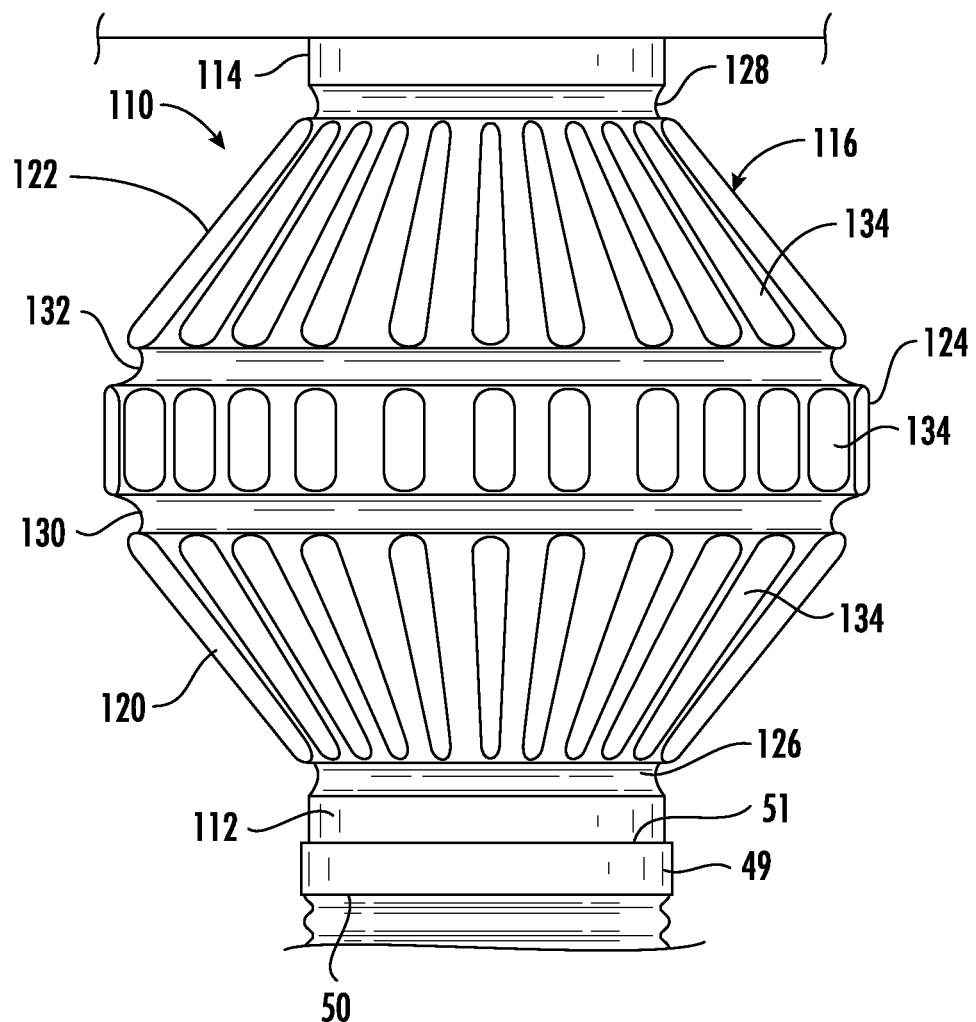
FIG. 10 is a partial side elevation view corresponding to FIG. 9 illustrating a constant volume boot of the displacement device.

Referring in relevant part to FIGS. 9 and 10, the boot 110, formed of a resilient elastomeric material, includes a lower collar 112, an upper collar 114, and a body 116. The body 116 extends between the lower collar 112 and the upper collar 114. The body 116 defines the fluid chamber 111 between the lower collar 112 and the upper collar 114 and includes lower and upper conical sections 120 and 122 and an intermediate ring section 124. The lower and upper conical sections 120 and 122 are integrally formed at their narrow portions with the respective lower and upper collars 112 and 114 by flexible hinges 126 and 128, respectively, and at their widened portions with intermediate ring section 124 by flexible hinges 130 and 132, respectively. The flexible hinges 126, 128, 130, and 132 are thinned regions of the body 116 that allow the lower conical section 120, the upper conical section 122, and the intermediate ring section 124 to pivot about these points relative to one another. Sections 120, 122, and 124, have axial profiles 134, convolutions, ribs, or both, for maintaining the sections 120, 122, and 124, axially rigid when boot 110 extends and retracts. These profiles 134 also permit the sections 120, 122, and 124, to circumferentially expand and retract when the boot 110 extends and retracts to maintain a constant volume within chamber 111. The boot 110 is a standard constant volume boot of known construction. Accordingly, additional details of the boot 110 are not discussed.

According to the invention, the lower collar 112 affixed to piston's 49 upper surface 51 surrounds the open lower end 104 of the bellows 102. The upper collar 114 affixed to an underside of the transfer tank 14 surrounds the open upper end 106 of the bellows 10. The body 116 surrounds the bellows 102 between the lower and upper collars 112 and 114 and extends upright through the transfer component from the lower collar 112 to the upper collar 114. The lower conical section 120 extends upright from hinge 126, connecting the lower conical section 120 to the lower collar 112, to hinge 130, connecting the lower conical section 120 to the intermediate ring section 124. The upper conical section 122 extends upright from hinge 132, connecting the upper conical section 122 to the intermediate ring section 124, to hinge 128, connecting the upper conical section 122 to the upper collar 114. The body 116 forms the chamber 111 about the bellows 102 extending upright through the chamber 111 from the lower collar 112 at bellow's 102 open lower end 104 to the upper collar 114 at the bellow's 102 open upper end 106.

According to the invention, the boot 110 has valves 140 and 142 configured to open and close independently. When valve 140 is open, it opens chamber 111 to transfer tank 14, opening the transition component in chamber 111 to the transfer component in transfer tank 14. When valve 140 is closed, it isolates chamber 111 from transfer tank 14, isolating the transition component in chamber 111 from the transfer component in transfer tank 14. When valve 142 is open, it opens chamber 111 to transfer tank 14, opening the transition component in chamber 111 to the transfer component in transfer tank 14. When valve 142 is closed, it isolates chamber 111 from the transfer tank 14, isolating the transition component in chamber 111 from the transfer component in transfer tank 14. In this embodiment, the valves 140 and 142 are on opposite sides of the upper conical section 122. In alternate embodiments, the valves 140 and 142 can be formed on opposite sides of the lower conical section 120, on opposite sides of the respective lower and upper sections 120, or elsewhere. Valves 140 and 142, the valve mechanism of the boot 110, are any of the valve types discussed above with valves mechanism 36/40.

Referring again to FIG. 9, an extensible and retractable bellows 150 is coupled between the piston 49 and the pressure tank 52, the preferred source of the pressurized fluid that pressure tank 52 sources to piston's 49 lower surface 51 via bellows 150. The bellows 150, the lower bellows of the displacement device 100, is a tubular concertina bellows made of Kevlar, ballistic nylon, blimp envelop material, or other material or combination of materials having inherently flexible, strong, cut-resistant, inelastic, non-stretchable, and fluid-impervious material characteristics. The bellows 150 is coupled to the piston 49. It extends downwardly through the transfer component from its open upper end 152 centered on and affixed to the lower surface 51 of the piston 49 to its lower end 154 coupled to the pressure tank 52 fluidly. The bellows 150 couples piston's 49 lower surface 50 to the pressure tank 52 fluidly. The pressure tank 52 sources the pressurized fluid to and holds it against piston's 49 lower surface 50 under constant pressure $p_1$ from pressure tank's 52 pressurized fluid. The lower surface 50 of the piston 49 has the surface area A in fluid communication with the pressure tank 52 that holds the pressurized fluid, preferably compressed air, at pressure $p_1$ against the lower surface 50. A conduit 160 fluidly coupled between the pressure tank 52 and bellow's 150 lower end 154 couples the pressure tank 52 to the bellows 150 fluidly. Thus, the piston's 49 lower surface 50 is constantly under pressure $p_1$ that exerts the force equal to $p_1 A$ on the lower surface 50. The upper surface 51 of the piston 49 in fluid communication with the return tank 16 is constantly under pressure p2 from the return component in the return tank 16.

In the return configuration of the bi-level tank 12, valve 142 is closed, isolating the transition component in chamber 111 from the transfer component in transfer tank 14. Valve 140 is open, opening the transition component in chamber 111 to the transfer component in transfer tank 14. Access port 34 is closed. Transfer port 38 is open, opening the return component in return tank 16 to the transfer component in transfer tank 14.

Figure 11:
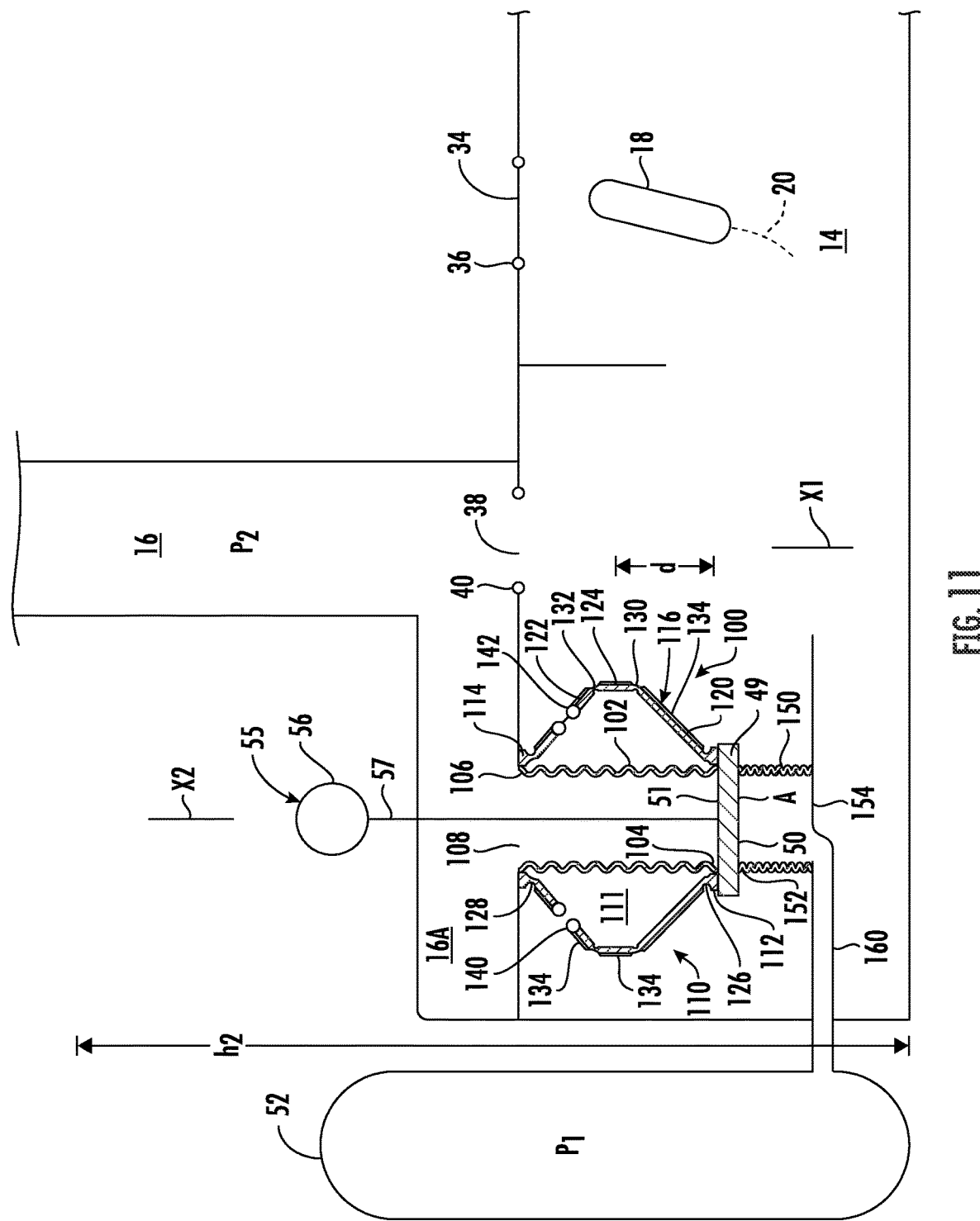
FIGS. 11-14 illustrate a sequence of operation of the embodiment of FIG. 9.

In the reset configuration of the bi-level tank 12 in FIG. 11, valve 140 is closed, isolating the transition component in chamber 111 from the transfer component in transfer tank 14. Valve 142 is open, opening the transition component in chamber 111 to the transfer component in transfer tank 14. Access port 34 is open. Transfer port 38 is closed, isolating the return component in return tank 16 from the transfer component in transfer tank 14.

Figure 14:
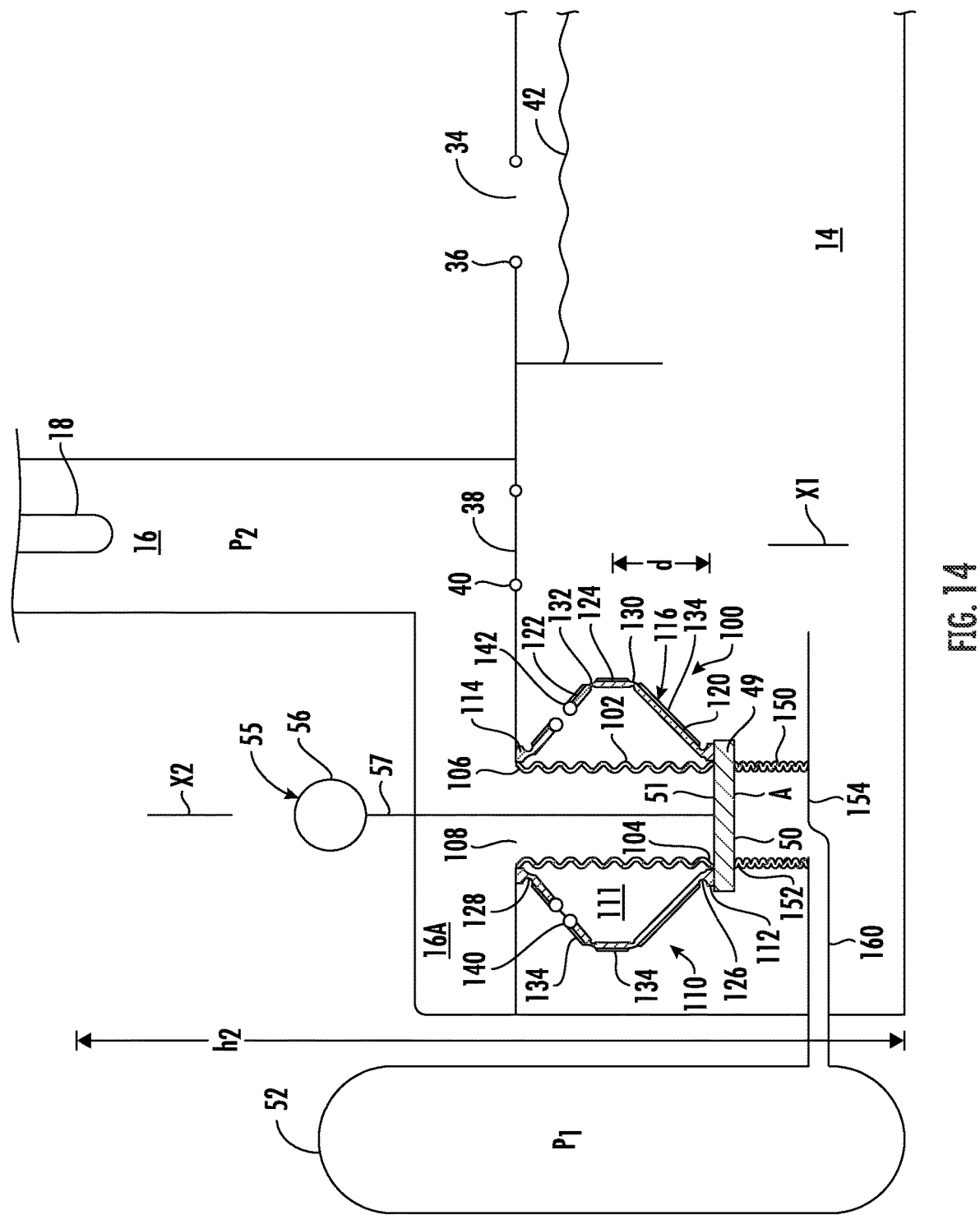

When the displacement device 100 is deactivated in FIGS. 9, 11, and 14 to its deactivated or un-displaced configuration, piston 49 is in its lowered position. Bellows 150 is retracted between its lower end 154 and piston's 49 lower surface 50. Bellows 102 is extended between piston's 49 upper surface 51 and return tank 16. Boot 110 is extended between piston's 49 upper surface 51 and return tank 16.

Figure 12:
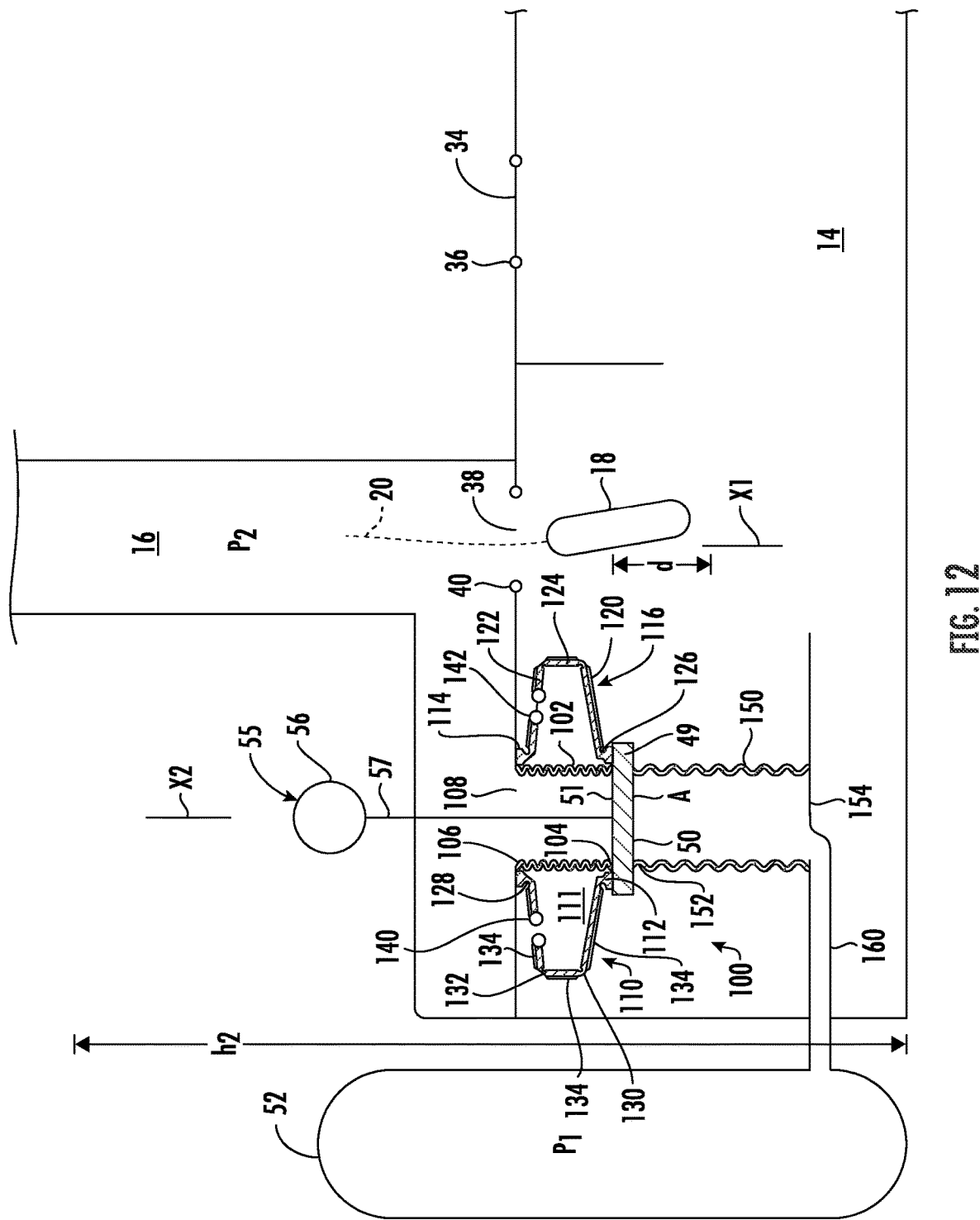
Figure 13:
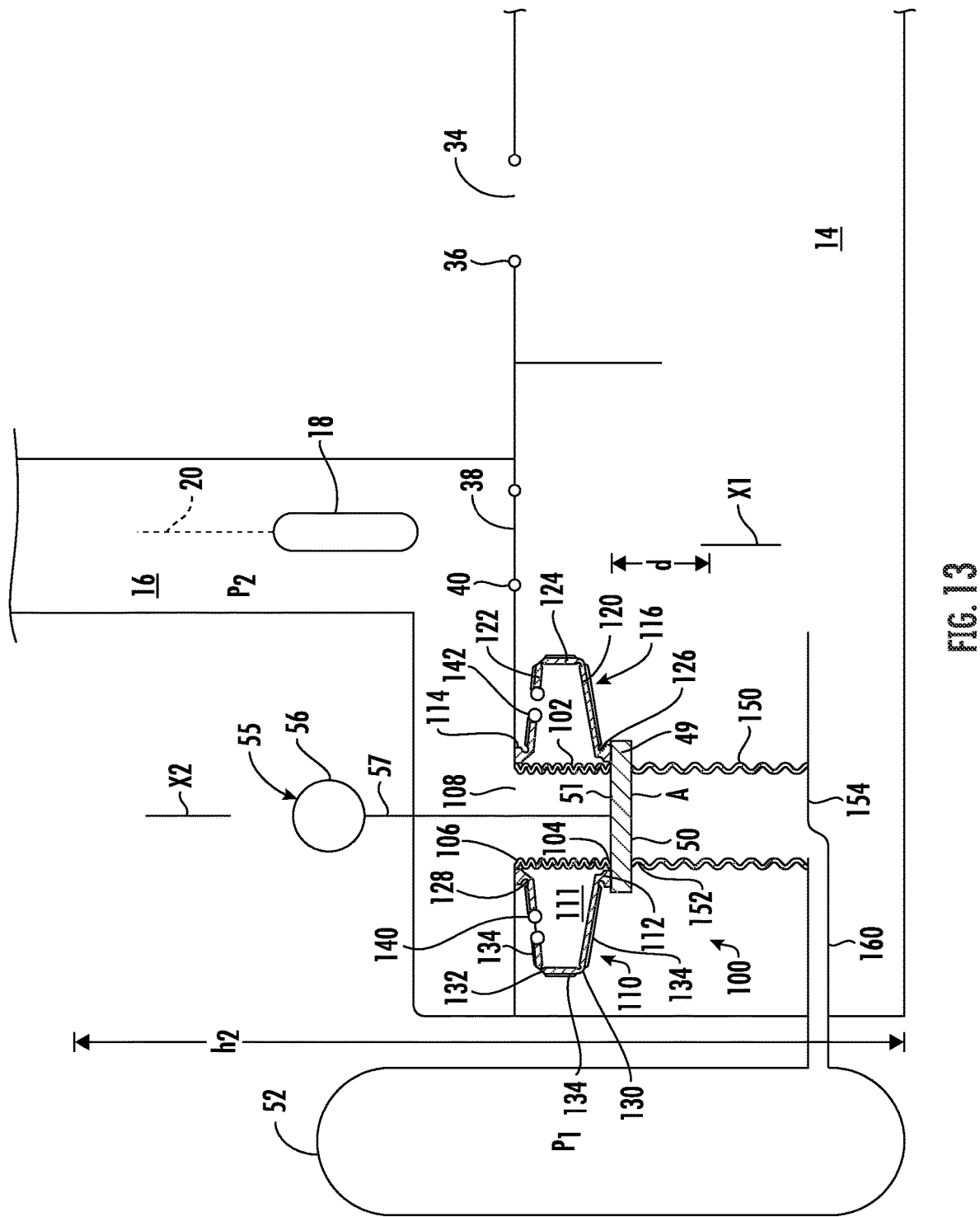

When the displacement device 100 is activated in FIGS. 12 and 13 to its activated or displaced configuration, piston 49 is in its raised position. Bellows 150 is extended between its lower end 154 and piston's 49 lower surface 50. Bellows 102 is retracted between piston's 49 upper surface 51 and return tank 16. Boot 110 is extended between piston's 49 upper surface 51 and return tank 16.

When the bi-level tank 12 is in its return configuration, the displacement device 100 is configured to activate to its activated or displaced configuration in FIGS. 12 and 13 from its deactivated or un-displaced configuration in FIG. 11 in response to activating the force-applying mechanism 55. When it activates, the force-applying mechanism 55 applies a force on the piston 49 sufficient to defeat the pressure differential Δp on the piston 49 produced by the upper surface 51 and the lower surface 50 under the concurrent pressures from the return component and the pressurized fluid, respectively. When the force applied to the piston 49 by the activated force-applying mechanism 55 defeats the pressure differential Δp, the piston 49 automatically displaces out of its lowered position to its raised position. At the same time, the bellows 150 extends between its lower end 154 and the lower surface 50 of the piston 49, the bellows 102 retracts between the upper surface 51 of the piston 49 and the return tank 16, and the boot 110 retracts between the upper surface 51 of the piston 49 and the return tank 16 while maintaining the constant volume of the chamber 111. This exchanges volume $V_d$ of the transfer component in bellows 102 with a corresponding volume of the fluid (i.e., the pressurized fluid) from pressure tank 52, lifting volume $V_d$ of the transfer component in bellows 102 into the return component in return tank 16 through port 108 and sources the corresponding volume of the fluid from pressure tank 52 to bellows 150.

When the bi-level tank 12 is in its reset configuration, the displacement device 100 is configured to deactivate to its deactivated configuration in FIG. 14 from its activated configuration in FIG. 13 in response to deactivating the force-applying mechanism 55. When the force-applying mechanism deactivates, it withdraws its force from the piston 49, automatically reestablishing the pressure differential Δp on the piston 49 produced by the upper surface 51 and the lower surface 50 under concurrent pressures from the return component and the pressure tank' 52 fluid, respectively. When the force from the force-applying mechanism 55 withdraws from the piston 49, it automatically displaces from its raised position to its lowered position. At the same time, the bellows 150 retracts between its lower end 154 and the lower surface 50 of the piston 49, the bellows 102 extends between the upper surface 51 of the piston 49 and the return tank 16, and the boot 110 extends between the upper surface 51 of the piston 49 and the return tank 16 while maintaining the constant volume of the chamber 111. This exchanges volume $V_d$ of the return component in return tank 16 with the corresponding volume of the fluid in bellows 150, lowering volume $V_d$ of the return component in return tank 16 through port 108 into the transfer component in bellows 102 and returning the corresponding volume of the fluid from bellows 150 to pressure tank 52.

In FIG. 9, the displacement device 100 is deactivated to its un-displaced configuration. Access port 34 is open, enabling power module 18 to enter the transfer component in transfer tank 14 through open access port 34 as shown in FIG. 11 and translate along pathway 20. Transfer port 38 is closed, isolating the return component in return tank 16 from the transfer component in transfer tank 14. Boot's 110 valves 140 and 142 are closed, isolating the transition component in chamber 111 from the transfer component in transfer tank 14. Lower surface 50 of piston 49 is constantly under pressure $p_1$ that exerts a force equal to $p_1 A$ on lower surface 50. Upper surface 51 of piston 49 is under constant pressure p$_2$ from the return component in return tank 16.

Upon the power module 18 entering the transfer component through the open access port 34 in FIG. 11, access port 34 closes, valve 140 opens, and transfer port 38 opens. This sets bi-level tank 12 to its return configuration, which opens transfer tank 14 and its contents to return tank and its contents. The return configuration of bi-level tank 12 establishes the unobstructed underwater pathway 20 from transfer tank 14 through the return tank 16 and up to the atmospherically exposed water surface of the return tank 16 extending upright from transfer tank 14. At this stage, the transfer component in transfer tank 14 and bellows 102 and the transition component in boot's 110 chamber 111 are under pressure p$_2$ produced by the increased head height h$_2$.

The displacement device 100 activates while the power module 18 is in transfer tank's 14 transfer component, displacing from its deactivated configuration in FIG. 11 to its activated configuration in FIG. 12. This displaces volume V$_d$ from transfer tank 14 to return tank 16, and power module 18 progresses along pathway 20 from transfer tank 14 to return tank 16 through open transfer port 38. When displacement device 100 activates, the upper surface 51 of the piston 49 must act against the water pressure p$_2$ caused by the head height h$_2$ in the bi-level tank 12 to displace the volume of water V$_d$ through the port 108 from the bellows 102 in the transfer tank 14 to the return tank 16. The work required to displace V$_d$ will be equal to the product of the projected displacement area for the upper surface 51 of the piston 49, the pressure p$_2$ in the return tank 16, and the displacement distance d required for a movement of the displacement device 100 to displace volume V$_d$.

The pressure tank 52, the preferred source of the pressurized fluid, sources the pressure p$_1$ of its pressurized fluid to lower surface 50 of piston 49. This pressure p$_1$ held against lower surface 50 acts directly against lower surface's 50 area A to create the biasing force Ap$_1$. This biasing force Ap$_1$ directly opposes the force of pressure p$_2$ that acts against piston's 49 upper surface 51. Thus, a structure is created where the pressure forces acting on the displacement device 100 are p$_1$ and p$_2$. The pressure p$_2$ from the head height h$_2$ in the return tank 16 and the pressure p$_1$ from the pressurized fluid from the pressure tank 52 create the pressure differential $\Delta p = p_2 - p_1$ across the piston 49, wherein p$_2$>p$_1$. Thus, a force proportional to $\Delta p$ will constantly act against the piston 49 to urge it into its deactivated configuration in FIG. 9. The boot's 110 now open valve 140 equalizes the pressure p$_2$ between transfer tank's 14 transfer component and the transition component in chamber 111, the volume of chamber 111 maintained constant by the boot 110. As described previously, the bias force creates $\Delta p$ that is relatively small, e.g., in a range between 1.5 and 2 psi. Accordingly, the activating force on the piston 49 from the force-applying mechanism 55 sufficient to overcome the pressure differential $\Delta p$ to displace piston 49 distance d from its lowered position in FIG. 11 to its raised position in FIG. 12 need only be greater than pressure p$_2$.

While the power module 18 is in transfer tank's 14 transfer component, the displacement device 100 displaces from its deactivated configuration in FIG. 11 to its activated configuration in FIG. 12 when the displacement device 100 activates. This concurrently displaces the volume of water V$_d$ from the bellows 102 in the transfer tank 14 to the return tank 16 and the same volume of fluid from the pressure tank 52 to the bellows 150 by the upwardly-displacing piston 49. The displacement device 100 activates in response to activating the force-applying mechanism 55, applying its force on the piston 49 sufficient to defeat the pressure differential $\Delta p$ across the piston 49, enabling the piston 49 to displace from its lowered position to its raised position automatically. At the same time, the power module 18 progresses along pathway 20 through the open transfer port 38 from the transfer tank 14 and into the return tank 16 in FIG. 13. When displacement device 100 activates in FIG. 11, it cycles from its deactivated configuration to its activated configuration in response to activating the force-applying mechanism 55, applying its force on the piston 49 sufficient to defeat the pressure differential $\Delta p$ on the piston 49. This exchanges the volume V$_d$ of the transfer component in the bellows 102 with the corresponding volume of the pressurized fluid from the pressure tank 52, lifting the volume V$_d$ of the transfer component in the bellows 102 into the return component in return tank 16 through port 108 by the upper surface 51 of the upwardly-displacing piston 49 and sourcing the corresponding volume of the fluid from the pressure tank 52 to the bellows 150 by the lower surface 50 of the upwardly-displacing piston 49.

The open valve 140 opening the transition component in chamber 111 to the transfer tank's 14 transfer component while the displacement device 100 displaces from its deactivated configuration to its activated configuration equalizes the pressure p$_2$ between the transfer component and the transition component. This pressure equalization between the transition and transfer components and the inherent ability of the boot 110 to maintain the chamber's 111 volume constant causes the chamber's 111 volume to remain fixed or otherwise unchanged while the boot 110 retracts between the upper surface 51 of the piston 40 and the return tank 16 in response to movement of the piston 49 from its lowered position in FIG. 11 to its raised position in FIG. 12. This disables volume loss in the transfer tank 14 enabling the described exchange of the volumes.

After the power module 18 transitions through the transfer port 38 from the transfer component in the transfer tank 14 to the return component in the return tank 16 in FIG. 13, the bi-level tank 12 transitions from the return configuration to the reset configuration and the displacement device 100 deactivates from its activated configuration to its deactivated configuration. This concurrently displaces volume V$_d$ from the return component in the return tank 16 to the bellows 102 in the transfer tank 14 and returns the same volume of fluid from the bellows 150 to the pressure tank 52 by the downwardly-displacing piston 49. When the bi-level tank 12 transitions to the reset configuration in FIG. 13 from the return configuration in FIG. 12, the transfer port 38 closes, the valve 140 closes, the valve 142 opens, and the access port opens. The transition from the return configuration to the reset configuration closes the transfer tank 14 from the return tank 16, isolating the transfer component in the transfer tank 14 from the return component in the return tank 16, and severs pathway 20 from the transfer tank 14 to the return tank 16. It also withdraws the pressure p$_2$ from the transfer component in the transfer tank 14 and the transition component in the boot's 110 chamber 111. The transfer component in the bellows 102 and the upper surface 51 of the piston 49 remain under pressure p$_2$ via the open port 108 coupling the bellows 102 and its contents to the return tank 16 and its contents.

While the power module 18 is in return tank's 16 return component, the displacement device 100 displaces from its activated configuration in FIG. 13 to its deactivated configuration in FIG. 14 in response to deactivation of the displacement device 100. Displacement device 100 deactivates and cycles from its activated configuration in FIG. 13 to its deactivated configuration in FIG. 14 in response to deactivation of the force-applying mechanism, removing its force on the piston 49. This reestablishes the pressure differential Δp across the piston 49, causing the piston 49 to displace from its raised position to its lowered position automatically under the influence of pressure $p_2$. The pressure differential Δp reestablished on the piston 49 when the displacement device 100 deactivates automatically displaces the piston 49 from its raised position to its lowered position, displacing the displacement device 100 from its activated configuration in FIG. 13 to its deactivated configuration in FIG. 14. This exchanges volume $V_d$ of the return component in return tank 16 with the corresponding volume of the fluid in bellows 150, lowering the volume $V_d$ of from the return component into bellows 102 through port 108 by upper surface 51 of the downwardly-displacing piston 49 and returning the corresponding volume of the fluid from bellows 150 to pressure tank 52 by lower surface 50 of the downwardly-displacing piston 49.

The open valve 142 opening the transition component in the chamber 111 to the transfer tank's 14 transfer component while the displacement device 100 displaces from its activated configuration to its deactivated configuration equalizes the pressure between the transfer component in the transfer tank 14 and the transition component in the boot's 110 chamber 111. This pressure equalization between the transition and transfer components and the inherent ability of the boot 110 to maintain chamber's 111 volume constant causes the chamber's 111 volume to remain fixed or otherwise unchanged while boot 110 extends between the upper surface 51 of the piston 40 and the return tank 16 in response to movement of the piston 49 from its raised position in FIG. 13 to its lowered position in FIG. 14. This disables volume loss in the transfer tank 14 enabling the described exchange of the volumes.

Upon displacement device 100 reaching its displaced configuration in FIG. 14, the valve 142 closes isolating the transition component in the boot's 110 chamber 111 from the transfer component in the transfer tank 14, resetting bi-level tank 12 to its configuration in FIG. 9 ready to receive the next successive power module 18. In accordance with the present invention, the successive configurations of the bi-level tank 12 and the displacement device 100 are repeated for each power module 18 duty cycle.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the invention, they are intended to be included within the scope thereof.

The invention claimed is:

1. A displacement device, comprising:
  a piston configured to displace reciprocally;
  an extensible and retractable bellows coupled to the piston, the bellows extending from the piston to an open end open to the piston;
  an extensible and retractable boot coupled to the piston, the boot extending over the bellows from the piston to a collar surrounding the open end and defining a chamber around the bellows; and
  the boot open between the piston and the collar, enabling fluid transfer into and out of the chamber through boot between the piston and the collar.

2. The displacement device according to claim 1, wherein the boot is open by a valve configured with the boot.

3. The displacement device according to claim 1, further comprising a force-applying mechanism operatively coupled to the piston.

4. The displacement device according to claim 1, further comprising the bellows and the boot each coupled to an upper surface of the piston, the open end of the bellows open to the upper surface of the piston.

5. The displacement device according to claim 1, further comprising the boot configured to maintain a constant volume of the chamber.

6. A displacement device, comprising:
  a piston configured to displace reciprocally;
  an extensible and retractable first bellows coupled to the piston, the first bellows extending from the piston to an open end open to the piston;
  an extensible and retractable boot coupled to the piston, the boot extending over the first bellows from the piston to a collar surrounding the open end and defining a chamber around the first bellows;
  an extensible and retractable second bellows coupled to the piston, the second bellows extending from the piston and configured to couple a fluid under pressure to the piston; and
  the boot open between the piston and the collar, enabling fluid transfer into and out of the chamber through boot between the piston and the collar.

7. The displacement device according to claim 6, wherein the boot is open by a valve configured with the boot.

8. The displacement device according to claim 6, further comprising:
  the first bellows and the boot each coupled to an upper surface of the piston, the open end of the bellows open to the upper surface of the piston; and
  the second bellows coupled to a lower surface of the piston, the second bellows configured to couple a fluid under pressure to the lower surface of the piston.

9. The displacement device according to claim 6, further comprising the boot configured to maintain a constant volume of the chamber.

10. An apparatus, comprising:
  a bi-level tank including a transfer tank under a return tank;
  a piston in the transfer tank, the piston configured to displace reciprocally relative to the return tank;
  an extensible and retractable bellows coupled between the piston and the bi-level tank, the bellows open to the piston and the return tank; and
  an extensible and retractable boot over the bellows and coupled between the piston and the bi-level tank, the boot defining a chamber around the bellows.

11. The apparatus according to claim 10, further comprising the chamber open to the transfer tank.

12. The apparatus according to claim 11, wherein the chamber is open to the transfer tank by an open valve configured with the boot.

13. The apparatus according to claim 10, further comprising a force-applying mechanism operatively coupled to the piston.

14. The apparatus according to claim 10, further comprising the bellows and the boot each coupled to an upper surface of the piston, the open end of the bellows open to the upper surface of the piston.

15. The apparatus according to claim 10, further comprising the boot configured to maintain a constant volume of the chamber.

16. An apparatus, comprising:
a bi-level tank including a transfer tank under a return tank;
a piston in the transfer tank, the piston configured to displace reciprocally relative to the return tank;
an extensible and retractable first bellows coupled between the piston and the bi-level tank, the first bellows open to the piston and the return tank;
an extensible and retractable boot over the first bellows and coupled between the piston and the bi-level tank, the boot defining a chamber around the first bellows; and
an extensible and retractable second bellows coupled to the piston, the second bellows extending from the piston and configured to couple a fluid under pressure to the piston.

17. The apparatus according to claim 16, further comprising the chamber open to the transfer tank.

18. The apparatus according to claim 17, wherein the chamber is open to the transfer tank by an open valve configured with the boot.

19. The apparatus according to claim 16, further comprising:
the first bellows and the boot each coupled to an upper surface of the piston, the open end of the first bellows open to the upper surface of the piston; and
the second bellows coupled to a lower surface of the piston, the second bellows configured to couple a fluid under pressure to the lower surface of the piston.

20. The apparatus according to claim 16, further comprising the boot configured to maintain a constant volume of the chamber.

* * * * *